(12) United States Patent
Kamath Koteshwara et al.

(10) Patent No.: US 11,513,216 B1
(45) Date of Patent: *Nov. 29, 2022

(54) DEVICE CALIBRATION FOR PRESENCE DETECTION USING ULTRASONIC SIGNALS

(71) Applicant: Amazon Technologies, Inc., Seattle, WA (US)

(72) Inventors: Krishna Kamath Koteshwara, Santa Clara, CA (US); Rui Wang, Sunnyvale, CA (US); Tarun Pruthi, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

This patent is subject to a terminal disclaimer.

(21) Appl. No.: 17/171,455

(22) Filed: Feb. 9, 2021

(51) Int. Cl.
| | |
|---|---|
| *G01S 15/58* | (2006.01) |
| *G01S 7/527* | (2006.01) |
| *H04R 3/00* | (2006.01) |
| *H04R 1/40* | (2006.01) |
| *G01S 15/04* | (2006.01) |

(52) U.S. Cl.
CPC .......... *G01S 15/582* (2013.01); *G01S 7/5273* (2013.01); *G01S 15/04* (2013.01); *H04R 1/406* (2013.01); *H04R 3/005* (2013.01)

(58) Field of Classification Search
CPC ...... G01S 15/582; G01S 7/5273; G01S 15/04; H04R 1/406; H04R 3/005
See application file for complete search history.

(56) References Cited

U.S. PATENT DOCUMENTS

| | | | |
|---|---|---|---|
| 10,732,258 B1 * | 8/2020 | Sundaram | G10L 25/30 |
| 10,795,018 B1 * | 10/2020 | Koteshwara | H04R 1/406 |
| 11,402,499 B1 * | 8/2022 | Kamath Koteshwara | |
| | | | G06F 3/011 |

* cited by examiner

*Primary Examiner* — Daniel Pihulic
(74) *Attorney, Agent, or Firm* — Lee & Hayes, P.C.

(57) ABSTRACT

Techniques for calibrating presence-detection devices to account for various factors that can affect the presence-detection devices' ability to detect movement. Presence-detection devices may detect movement of a person in an environment by emitting ultrasonic signals into the environment, and characterizing the change in the frequency, or the Doppler shift, of the reflections of the ultrasonic signals off the person caused by the movement of the person. However, factors such as environmental acoustic conditions, noise sources, etc., may affect the ability of the presence-detection devices to detect movement. To calibrate for these factors, the presence-detection devices may use a loudspeaker to emit an ultrasonic sweep signal that spans different frequencies in an ultrasonic frequency range. The presence-detection devices may generate audio data using a microphone that represents the ultrasonic sweep signal, and analyze that audio data to determine an optimal frequency range and/or transmission power for subsequent ultrasonic signal transmissions.

20 Claims, 13 Drawing Sheets

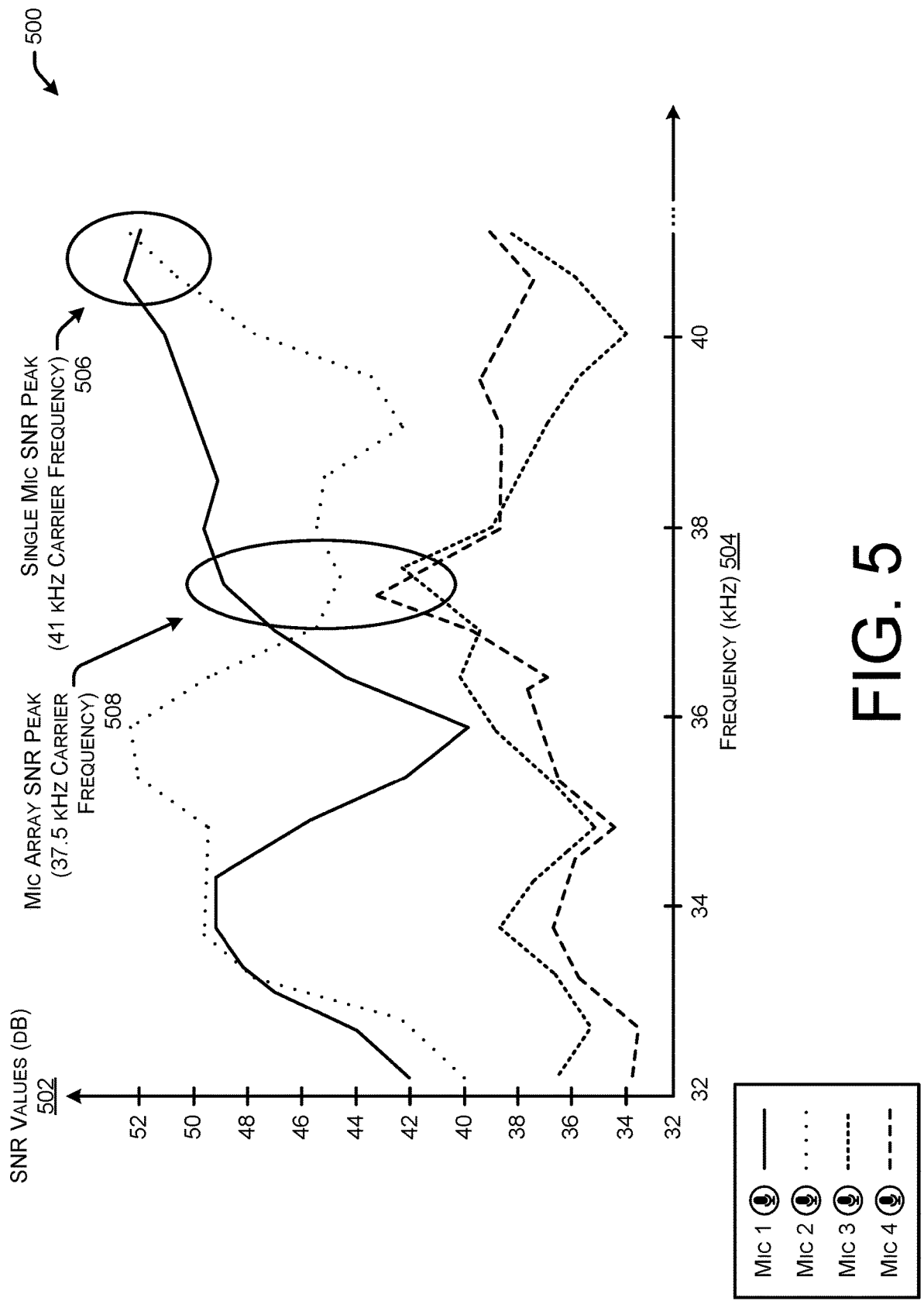

1000 ⤵

```
CAUSE A LOUDSPEAKER TO EMIT, OVER A PERIOD OF TIME, AN ULTRASONIC SWEEP SIGNAL INTO
AN ENVIRONMENT OF THE COMPUTING DEVICE, THE ULTRASONIC SWEEP SIGNAL BEING EMITTED
AT DIFFERENT FREQUENCIES OVER A FREQUENCY RANGE
1002
```
↓
```
GENERATE, AT LEAST PARTLY USING A MICROPHONE, DATA REPRESENTING REFLECTED
SIGNALS, CORRESPONDING TO THE ULTRASONIC SWEEP SIGNAL, FOR THE PERIOD OF TIME
1004
```
↓
```
DETERMINE, USING THE DATA, A FIRST SIGNAL-TO-NOISE RATIO (SNR) VALUE FOR A FIRST
FREQUENCY RANGE WITHIN THE FREQUENCY RANGE
1006
```
↓
```
DETERMINE, USING THE DATA, A SECOND SNR VALUE FOR A SECOND FREQUENCY RANGE
WITHIN THE FREQUENCY RANGE
1008
```
↓
```
DETERMINE THAT THE FIRST SNR VALUE IS GREATER THAN THE SECOND SNR VALUE
1010
```
↓
```
CONFIGURE THE LOUDSPEAKER TO EMIT AN ULTRASONIC SIGNAL AT A CARRIER FREQUENCY
THAT IS WITHIN THE FIRST FREQUENCY RANGE
1012
```

FIG. 10

DEVICE CALIBRATION FOR PRESENCE DETECTION USING ULTRASONIC SIGNALS

BACKGROUND

Many devices and technologies exist for detecting the presence of users in different environments, and for different purposes. For instance, motion-sensing lights are used to automate lighting control based on detecting motion, motion-sensing security devices can trigger alarms upon detecting motion, etc. These presence-detection devices can utilize many different technologies to detect the presence and/or motion of a user in an environment, such as acoustic sensing, passive infrared sensing (PIR) sensing, Wi-Fi Channel Sate Information (CSI) sensing, radio-wave sensing, etc. In some examples, presence-detection devices may detect movement of a user by emitting ultrasonic signals into an environment, and characterizing the change in the frequency, or the Doppler shift, of the reflections of the ultrasonic signals off the user caused by the movement of the user relative to the presence-detection devices. However, as presence-detection devices continue to be introduced into new and different environments, various difficulties may arise when attempting to detect movement in these environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates an example diagram depicting variations in signal-to-noise ratio (SNR) values in sensor data generated by different microphones for a range of carrier frequencies.

FIG. 10 illustrates a flow diagram of an example process for calibrating a presence-detection device by using an ultrasonic sweep signal to generate audio data, calculating SNR values for frequency ranges in the sweep signal, and determining an optimal carrier frequency at which to emit ultrasonic signals for presence detection.

DETAILED DESCRIPTION

Figure 1:
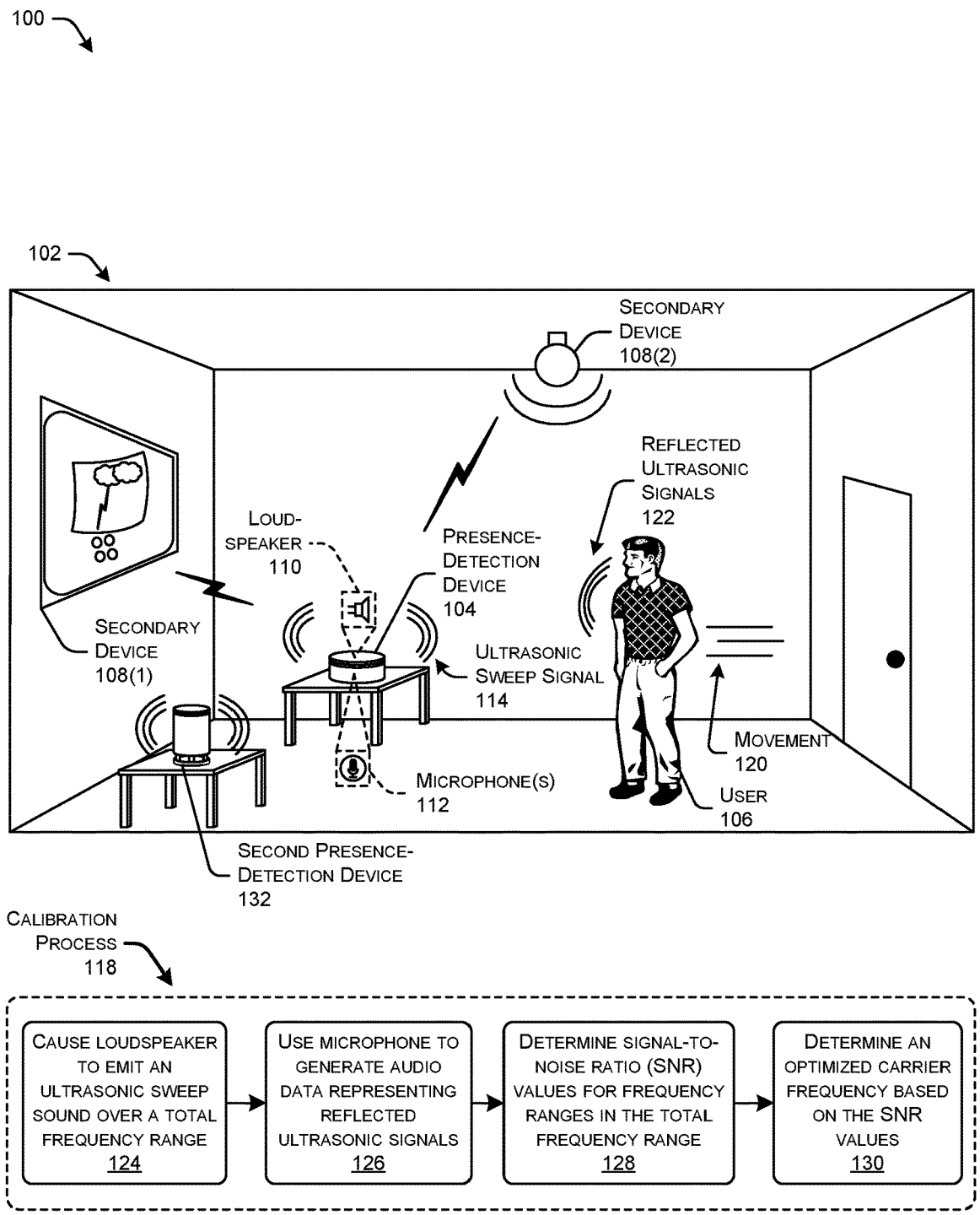
FIG. 1 shows an illustrative presence-detection device in a home environment that is undergoing a calibration process to compensate for factors that affect performance of the presence-detection device. The architecture includes a presence-detection device controlling secondary devices physically situated in the home based on detecting presence of a user. In this example, the presence-detection device has a loudspeaker and a microphone that are calibrated to detect presence, and/or lack of presence, of a user.

This disclosure describes, in part, techniques for calibrating presence-detection devices that detect movement in order to account for various factors that can affect the presence-detection devices' ability to detect movement. The presence-detection devices described herein may detect movement of a person in an environment by emitting ultrasonic signals into the environment, and characterizing the change in the frequency, or the Doppler shift, of the reflections of the ultrasonic signals off the person caused by the movement of the person relative to the presence-detection devices. However, factors such as environmental acoustic conditions, noise sources, loudspeaker frequency response, microphone frequency response, and/or other factors may negatively affect the ability of the presence-detection devices to detect movement using ultrasonic signals. To calibrate the presence-detection devices to account for these factors, the presence-detection devices may use a loudspeaker to emit one or more ultrasonic sweep signals that span multiple different frequencies in an ultrasonic frequency range. The presence-detection devices may generate audio data using a microphone that represents the ultrasonic sweep signal, and analyze that audio data to determine an optimal frequency range to use for subsequent ultrasonic signal transmissions. Further, the presence-detection devices may use the audio data to determine an optimal transmission power at which to transmit the ultrasonic signals into environments in order to detect movement.

The calibration techniques described herein may include an automatic-calibration process in which a presence-detection device automatically determines various optimal parameters for emitting ultrasonic signals, such as optimal carrier frequency, optimal transmission power, and/or an optimal microphone (if the device includes a microphone array). The automatic-calibration process may be initiated in response to a predefined device event, such as the presence-detection device being powered up, a pause and resume of a presence-detection component, after a predetermined period of time, etc. When the automatic-calibration process is triggered, the presence-detection device may begin using a loudspeaker to emit one or more ultrasonic sweep signals into an environment of the presence-detection device. The ultrasonic sweep signal may generally span multiple different frequencies that are in the ultrasonic range, or frequency ranges that are inaudible to humans (e.g., frequencies above 20 kilo Hertz (kHz)). As an example, the ultrasonic sweep signal includes multiple different frequencies in between 30 kHz and 42 kHz. In an example, the ultrasonic sweep signal may be a linear sweep signal that ramps up from 30 kHz to 42 kHz over a period of time (e.g., 500 milliseconds (ms)).

During this period of time, the presence-detection device may use a microphone to generate audio data that represents reflections of the ultrasonic sweep signal off objects in the environment. However, the audio data may also represent unwanted, background noise in the environment. Accordingly, the presence-detection device may stop emitting sound for another period of time (e.g., another 500 ms) and generate audio data that represents any background noise the environment. The audio data that is generated while the loudspeaker is not emitting any sound, or "background signals," may represent noise in the environment, and the audio data that is generated while the loudspeaker is emitting the ultrasonic sweep signal, or "foreground signals," may represent the background noise as well as the reflections of the ultrasonic sweep signal. In order to determine which frequency range in the ultrasonic sweep frequency is optimal for a carrier frequency, the presence-detection device may calculate signal-to-noise ratio (SNR) values for multiple frequency ranges within the total frequency range of the ultrasonic sweep signal. For instance, the presence-detection device may calculate an SNR value for a frequency range of 30 kHz to 32 kHz, an SNR value for a frequency range of 32 kHz to 34 kHz, and so forth. In order to determine SNR values for the frequency ranges, however, the presence-detection device may reduce or attenuate a representation of the noise signals from the foreground signal such that the foreground signal substantially represents the desired, reflection signals.

The presence-detection device may use the background signal that represents noise signals in the environment while the loudspeaker is not emitting sound to attenuate the noise signals from the foreground signal. The background signal may be used to identify, and remove or attenuate the noise signal from the foreground signal such that the foreground signal is substantially a representation of the reflections of the ultrasonic sweep signal. The presence-detection device may then begin accumulating energy values for the various frequency ranges of the foreground signal, and for the various frequency ranges of the background signal, into groups of energy values. For instance, the energy values for the foreground signals in the frequency range of 31 kHz to 33 kHz may be accumulated into a group of energy values. Similarly, the energy values for the background signals in the frequency range of 31 kHz to 33 kHz may be accumulated into another group of energy values. After accumulating the energy values for the various frequency ranges, the presence-detection device may use the energy values to compute SNR values for the frequency ranges. For instance, the presence-detection device may divide the accumulated energy values of the foreground signals by the accumulated energy values of the background signals for the respective frequency ranges.

In some examples, taking one sample of the foreground signals and the background signals may not be representative of the environment noise or acoustics. For instance, a noise that is not usually in the background of the environment may have occurred during the time the audio data was generated for the foreground signals and/or the background signals. To account for this scenario, the presence-detection device may emit a sequence of ultrasonic sweep signals separated by periods of time during which the loudspeaker is not active. In this way, multiple sets of audio data representing different instances of the ultrasonic sweep signal may be generated, and multiple sets of audio data representing different samples of the background noise may be generated. As described above, the audio data representing the background signals may be used to attenuate or remove the noise signals from the foreground signals. Further, energy values for the sets of frequency ranges across all of the different instances of the ultrasonic sweep signals may be accumulated, and the energy values for the sets of frequency ranges across all of the instances of the background signals may be accumulated. These accumulated energy values may then be used to generate SNR values for the various frequency ranges. In this way, multiple different instances of ultrasonic sweep signals may be emitted and analyzed, and multiple samples of background noise may be analyzed, to determine accurate SNR values for the environment and the presence-detection device.

After determining the SNR values, the presence-detection device may determine which frequency range has the highest SNR value, or is otherwise optimal for use as a carrier frequency. For instance, if the frequency range of 31 kHz to 33 kHz has the highest SNR value, or at least one of the highest SNR values, the presence-detection device may select a frequency within that range (e.g., 31.5 kHz, 32 kHz, 32.5 kHz, etc.) as a carrier frequency for ultrasonic signals that are emitted in the environment for movement detection.

In some examples, the presence-detection device may include multiple microphones, such as a microphone array. Depending on the orientations and/or locations of the different microphones on the presence-detection device, the microphones may have different SNR values for the audio data representing the foreground signals and the background signals. In such examples, the above-noted techniques for determining SNR values for the frequency ranges in the ultrasonic sweep signal may be used for each of the microphones. Then, the microphone with the best SNR value may be selected as the microphone used to generate audio data representing reflections of ultrasonic signals for movement detection.

After determining the optimal carrier frequency and/or the optimal microphone, the presence-detection device may perform techniques for determining an optimal transmission power at which to emit the ultrasonic signals via a user-input calibration process. During the user-input calibration process, the presence-detection device may require input from a user to determine how the user moves through the environment. For instance, the optimal transmission power may different for a user that moves quickly as opposed to a user that moves slowly. In the user-input calibration process, the presence-detection device may instruct the user to walk to different sides of the room while the presence-detection device emits ultrasonic signals. The presence-detection device may analyze audio data representing reflections of the ultrasonic signals off of the user, and if the presence-detection device is not able to detect movement, the presence-detection device may increase the power level at which the ultrasonic signals are emitted until movement is reliably tracked. Alternatively, if the presence-detection device is able to detect the user is walking, the presence-detection device may decrease the power level at which the ultrasonic signals are emitted until movements of the user are reliably tracked. In this way, the presence-detection device may use a user-input calibration process to determine an optimal transmission power based on movement characteristics of the user.

After completion of the calibration processes, the presence-detection device may begin emitting ultrasonic signals into the environment at the optimal carrier frequency and/or optimal transmission power, and may further receive reflections of the signals using the optimal microphone. The presence-detection device may periodically, or continuously, emit ultrasonic signals into the environment to determine if a user is present in the room, or depending on the use-case, whether the room is vacant. The presence-detection devices may use the loudspeaker to emit an ultrasonic signal at the determined frequency, and analyze audio data generate by the microphone array to detect one or more of (i) motion of a person, (ii) a direction of the motion of the person, or (iii) a number of people in the room. In some examples, the algorithms utilized by the presence-detection devices when analyzing the audio data to detect movement are based upon the Doppler Effect. Generally, the Doppler effect (or the Doppler shift) is the change (increase or decrease) in frequency or wavelength of a wave in relation to an object that is moving relative to the wave source. As an illustration, the Doppler effect is responsible for how a siren on an ambulance sounds louder and shriller as it approaches a person, and changes its pitch as soon as the ambulance passes the person.

In order to analyze the audio data to determine whether the reflection of the ultrasonic signal represented in the audio data indicates movement of a person due to a change in frequency according to the Doppler effect, the presence-detection devices may divide the signal represented in the audio data into its frequency components, or its magnitude and phase components. For instance, the presence-detection devices may utilize one or more algorithms, such as Fast Fourier transform (FFT), to transform the signal represented in the audio data in the time domain into the frequency domain, and represent the frequency of the reflected ultrasonic signal by the magnitude and phase components.

Once the reflected signal is represented by its magnitude and phase components, the presence-detection devices may further utilize a log-transform to transform the magnitude components of the frequency of the reflected signal. For instance, due to the high-dynamic range of the magnitude components of the frequency of the reflected signal, and because the amount of reflection that occurs from movement of the user is relatively small (may appear similar to noise), the log-transform may transform the magnitude components using a log-transforming into a larger range. After applying a log-transform to the magnitude components, the change in magnitude caused by the reflection of the ultrasonic signal off of the moving object, or person, will be more easily identifiable.

In some examples, to determine whether the frequency response of the reflection of the ultrasonic signal indicates a reflection off of a moving object due to the Doppler effect, one or more machine-learning models may be trained and utilized as classifiers to indicate whether movement has been detected in the environment. For instance, a machine-learning model, such as a neural network, may be trained with training data, such as training data that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the machine-learning models may be trained to identify input vectors as representing reflections of ultrasonic signals that reflected off a moving object, or that did not reflect off a moving object.

Further, the one or more machine-learning models may additionally be trained to identify the direction of movement of the object through the environment. The microphone array may include multiple microphones that are orientated in different directions and that generate, or otherwise are used to create, multi-channel feature data for frequency components of the reflection of the ultrasonic signal, such as phase components. The machine-learning model(s) may be trained using feature vectors that represent the phase components, or the feature vectors/feature data representing the phase components, from multiple microphones, or multiple of the multi-channel feature data sources. For instance, the machine-learning model(s) may be trained to identify, based on a comparison between phase components representing the reflection of the ultrasonic signal detected by two different microphones, a direction of the object as it moves through the environment. As an example, a first microphone may capture audio data representing a reflection of an ultrasonic signal for 8 seconds of time, and a second microphone that is oriented in a different direction may capture audio data representing the reflection of the ultrasonic signal for substantially the same 8 seconds of time. Feature vectors may be created for each of those audio channel sources that represent the phase of the frequency response of the reflection of the ultrasonic signal. The machine-learning model(s) may be trained to determine, based on a comparison (e.g., subtraction) of the feature vectors representing phase components, a direction of movement of the object as it moves during those 8 seconds. In this way, two (or more) microphones in a microphone array may be utilized to determine the direction the object is moving in the environment.

In even further examples, the machine-learning models may be trained to determine a number of people in the environment that are moving. As an example, the microphone array in the presence-detection devices may include microphones that are oriented in different directions. For instance, a first microphone may be facing, and/or performing beamforming techniques, to generate audio data representing sound emanating from a 180-degree difference than an orientation at which a second microphone in the array is facing/beamforming to capture sound. The machine-learning models may be trained to determine, based on the feature data, that because each of the microphones are generating audio data which represent movement, and the audio data is being captured with, for example, higher than a threshold SNR value (meaning the object is in the beamforming field for each microphone), then there may be at least two objects moving in the environment.

Generally, the techniques described herein may be implemented when users of the presence-detection devices have opted in for use of the presence-detection services. For instance, users may interact with the presence-detection device, a user account associated with the presence-detection device, and/or otherwise indicate that they would like to use the presence-detection services described herein.

In some examples, the techniques described herein may include various optimizations. For instance, when the presence-detection devices are playing music audio data, or otherwise outputting audio data in a human-audible frequency range, the presence-detection devices may be configured to determine how to mix the music audio data with the ultrasonic audio data in such a way that saturation is avoided. For instance, the presence-detection devices may analyze the music audio data stored in an audio buffer and determine locations at which to mix the audio data representing the ultrasonic signals in order to avoid saturation of the different audio data. Further details regarding this are described below.

While the techniques described herein may be applied and useful in many scenarios, the presence-detection devices may perform various operations upon detecting movement of a person, detecting a direction of the movement of the person, and/or detecting the number of people in the room. For instance, the presence-detection devices may cause various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative architecture 100 including a home environment 102 in which a presence-detection device 104 undergoes a calibration process to compensate for factors that affect performance of the presence-detection device 104. The architecture 100 includes at least one presence-detection device 104 controlling secondary devices 108 (e.g., television 108(1), light 108(2), or any other controllable device) physically situated in the home 102 based on detecting presence of a user 106. In this example, the presence-detection device 104 includes or has a loudspeaker 110 and one or more microphones 112 to detect presence, and/or lack of presence, of the user 106. The presence-detection device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

As shown in FIG. 1, the loudspeaker 110 of the presence-detection device 104 may transmit, or otherwise output, an ultrasonic sweep signal 114. Generally, the loudspeaker 110 may comprise any type of electroacoustic transducer that convers an electric audio signal into a corresponding sound. In some instances, the loudspeaker 110 may be an existing on-board speaker configured to output sound within frequency ranges that are audible to humans, such as 35 Hz-20 kHz. However, in the illustrated example the ultrasonic sweep signal 114 may include at least a pulsed, or a continuous, emission of the signal 114 at a frequency that is outside the frequency range in which humans can hear sound (e.g., over 20 kHz). Thus, the loudspeaker may be emitting an ultrasonic sweep signal 114, such as ultrasonic signals, that are traditionally out-of-band for the loudspeaker 110. As illustrated, FIG. 1 may represent a high-level calibration process 118 performed by the presence-detection device 104 in order to calibrate parameters of the presence-detection device 104 for detecting movement in the environment 102.

The presence-detection device 104 may determine to perform an automatic-calibration process 118 in which the presence-detection device 104 automatically determines optimal parameters for emitting ultrasonic signals, such as optimal carrier frequency, optimal transmission power, and/or an optimal microphone (if the device includes a microphone array). The automatic-calibration process 118 may be initiated in response to a predefined device event, such as the presence-detection device 104 being powered up, a pause and resume of a presence-detection component, after a predetermined period of time, etc.

When the automatic-calibration process 118 is triggered, the presence-detection device 104 may, at 124, begin using the loudspeaker 110 to emit one or more ultrasonic sweep signals into an environment of the presence-detection device. The ultrasonic sweep signal 114 may generally span multiple different frequencies that are in the ultrasonic range, or frequency ranges that are inaudible to humans (e.g., frequencies above 20 kilo Hertz (kHz)). As an example, the ultrasonic sweep signal includes multiple different frequencies in between 30 kHz and 42 kHz. In an example, the ultrasonic sweep signal may be a linear sweep signal that ramps up from 30 kHz to 42 kHz over a period of time (e.g., 500 ms, 1 second, etc.).

During this period of time, the presence-detection device may, at 126, use the microphone(s) 112 to generate audio data that represents reflected ultrasonic signals 122 off objects in the environment 102. However, the audio data may also represent unwanted, background noise in the environment 102. Accordingly, the presence-detection device 104 may stop emitting sound for another period of time (e.g., another 500 ms) and generate audio data that represents any background noise the environment 102. The audio data that is generated while the loudspeaker 110 is not emitting any sound, or "background signals," may represent noise in the environment 102, and the audio data that is generated while the loudspeaker 110 is emitting the ultrasonic sweep signal 114, or "foreground signals," may represent the background noise as well as the reflections of the ultrasonic sweep signal 114.

In order to determine which frequency range in the ultrasonic sweep frequency is optimal for a carrier frequency, the presence-detection device 104 may determine, at 128, SNR values for multiple frequency ranges within the total frequency range of the ultrasonic sweep signal 114. For instance, the presence-detection device 104 may calculate an SNR value for a frequency range of 30 kHz to 32 kHz, an SNR value for a frequency range of 32 kHz to 34 kHz, and so forth. In order to determine SNR values for the frequency ranges, however, the presence-detection device 104 may reduce or attenuate a representation of the noise signals from the foreground signal such that the foreground signal substantially represents the desired, reflection signals.

The presence-detection device 104 may use the background signal that represents noise signals in the environment 102 while the loudspeaker 110 is not emitting sound to attenuate the noise signals from the foreground signal. The background signal may be used to identify, and remove or attenuate the noise signal from the foreground signal such that the foreground signal is substantially a representation of the reflections of the ultrasonic sweep signal 114. The presence-detection device 104 may then begin accumulating energy values for the various frequency ranges of the foreground signal, and for the various frequency ranges of the background signal, into groups of energy values. For instance, the energy values for the foreground signals in the frequency range of 31 kHz to 33 kHz may be accumulated into a group of energy values. Similarly, the energy values for the background signals in the frequency range of 31 kHz to 33 kHz may be accumulated into another group of energy values. After accumulating the energy values for the various frequency ranges, the presence-detection device 104 may use the energy values to compute SNR values for the frequency ranges. For instance, the presence-detection device 104 may divide the accumulated energy values of the foreground signals by the accumulated energy values of the background signals for the respective frequency ranges.

In some examples, taking one sample of the foreground signals and the background signals may not be representative of the environment noise or acoustics. For instance, a noise that is not usually in the background of the environment 102 may have occurred during the time the audio data was generated for the foreground signals and/or the background signals. To account for this scenario, the presence-detection device 104 may emit a sequence of ultrasonic sweep signals 114 separated by periods of time during which the loudspeaker 110 is not active. In this way, multiple sets of audio data representing different instances of the ultrasonic sweep signal 114 may be generated, and multiple sets of audio data representing different samples of the background noise may be generated. As described above, the audio data representing the background signals may be used to attenuate or remove the noise signals from the foreground signals. Further, energy values for the sets of frequency ranges across all of the different instances of the ultrasonic sweep signals 114 may be accumulated, and the energy values for the sets of frequency ranges across all of the instances of the background signals may be accumulated. These accumulated energy values may then be used to generate SNR values for the various frequency ranges. In this way, multiple different instances of ultrasonic sweep signals may be emitted and analyzed, and multiple samples of background noise may be analyzed, to determine accurate SNR values for the environment 102 and the presence-detection device 104.

After determining the SNR values, the presence-detection device 104 may determine, at 130, which frequency range has the highest SNR value, or is otherwise optimal for use as a carrier frequency. For instance, if the frequency range of 31 kHz to 33 kHz has the highest SNR value, or at least one of the highest SNR values, the presence-detection device 104 may select a frequency within that range (e.g., 31.5 kHz, 32 kHz, 32.5 kHz, etc.) as a carrier frequency for ultrasonic signals that are emitted in the environment for movement detection.

After determining the optimal carrier frequency, the presence-detection device 104 may perform techniques for determining an optimal transmission power at which to emit the ultrasonic signals via a user-input calibration process. During the user-input calibration process, the presence-detection device 104 may require input from a user 106 to determine how the user 106 moves through the environment 102. For instance, the optimal transmission power may different for a user 106 that moves quickly as opposed to a user 106 that moves slowly. In the user-input calibration process, the presence-detection device 104 may instruct the user 106 to walk to different sides of the environment 102 while the presence-detection device emits ultrasonic signals.

The presence-detection device 104 may analyze audio data representing reflections of the ultrasonic signals off of the user 106, and if the presence-detection device 104 is not able to detect movement, the presence-detection device 104 may increase the power level at which the ultrasonic signals are emitted until movement is reliably tracked. Alternatively, if the presence-detection device 104 is able to detect the user is walking, the presence-detection device 104 may decrease the power level at which the ultrasonic signals are emitted until movements of the user 106 are reliably tracked. In this way, the presence-detection device 104 may use a user-input calibration process to determine an optimal transmission power based on movement characteristics of the user 106.

After determining the optimal parameters, the presence-detection device 104 may begin performing techniques to detect movement of an object, such as the user 106. At 118, the presence-detection device 104 may cause the loudspeaker 110 to emit the ultrasonic sound (e.g., emitted signal) into the home 102. In some examples, the presence-detection device 104 may continuously cause the loudspeaker 110 to emit the ultrasonic sound, while in other examples, the ultrasonic signal may be emitted periodically, or pulsed.

Upon being emitted, the signal will generally reflect off of objects in the home 102. As briefly mentioned above, when the emitted signal bounces off objects, various changes to the characteristics of the audio signal may occur. For instance, the Doppler effect (or Doppler shift) is one such change in audio signal characteristics where the frequency or wavelength of a wave, such as an emitted signal wave, changes in relation to an emitting object upon bouncing off of a moving object. In the illustrated example, the emitted signal may experience a change in frequency upon reflecting off the user 106 if the user 106 is moving. Thus, because there is movement 120 user 106, the reflected sound 122 (or reflected signal) may experience a change in frequency. Generally, if the movement 120 of the user 106 is towards the loudspeaker, then the reflected signal may have a higher frequency compared to the emitted signal when detected at the presence-detection device 104. Conversely, the reflected sound may have a lower frequency relative to the presence-detection device 104 compared to the emitted signal when the movement 120 of the user 106 is away from the presence-detection device 104.

The presence-detection device 104 may use the microphone(s) 112 to generate audio data representing the reflected ultrasonic sound. In some examples, the microphone(s) 112 may include two or more microphones arranged on, or in, the presence-detection device 104 in any pattern (e.g., rows of microphones, circular pattern on a surface, offset and/or alternating rows of microphones, etc.). Further, the microphones in the microphone(s) 112 may be facing, or oriented, in different directions to capture sound from different directions with a better signal-to-noise ratio. Additionally, or alternatively, the presence-detection device 104 may performing acoustic processing on audio data/ signals generated by the microphones of the microphone(s) 112 in order to perform beamforming to perform directional signal/sound reception in the home environment 102. In this way, the microphones in the microphone(s) 112 may be configured to detect sound from different regions of the home 102 with stronger SNR values. Generally, the microphones of the array 112 may comprise transducers that convert sound (e.g., reflected sound) into electrical signals, or audio data.

The presence-detection device 104 may include one or more components which extract feature data from the audio data. In some examples, each of the microphones 112 may create an audio channel, thus creating a multi-channel flow of audio data. The components may perform various processing on the audio data channels (e.g., filtering, down sampling, Fourier transform(s), log-transform(s), etc.) prior to extracting the feature data. In some examples, the components of the presence-detection device 104 may extract magnitude feature data and phase feature data that represent the frequency of the reflected sound as detected by each microphone of the array 112 for periods of time to determine if movement 120 of the user 106 exists in the home 102.

The presence-detection device 104 may classify the feature data as indicating movement in the environment 102. For instance, the presence-detection device 104 may include one or more machine-learning models that have been trained to determine whether feature data, such as magnitude feature data and/or phase feature data, indicate that reflected sounds have bounced off of a moving object, such as the user 106. Additionally, as described in more detail below, the components of the presence-detection device 104 may further be configured to determine a direction of the movement 120 of the user 106 based on the phase feature data, and also determine whether multiple users 106 are in the environment 102.

In some instances, the environment 102 may include a second presence-detection device 132 that is operating at least partly while the calibration process 118 is occurring. For instance, the presence-detection device 132 may be emitting ultrasonic signals into the environment while the presence-detection device 104 is performing the calibration process 118. In this way, the calibration process 118 may help the presence-detection device 104 account for the ultrasonic signals being emitted by the second presence-detection device 132. In this way, the presence-detection device 104 may identify and characterize the signals and sounds emitted from the second presence-detection device 132 as background noise for which the device 104 is calibrated.

Figure 2A:
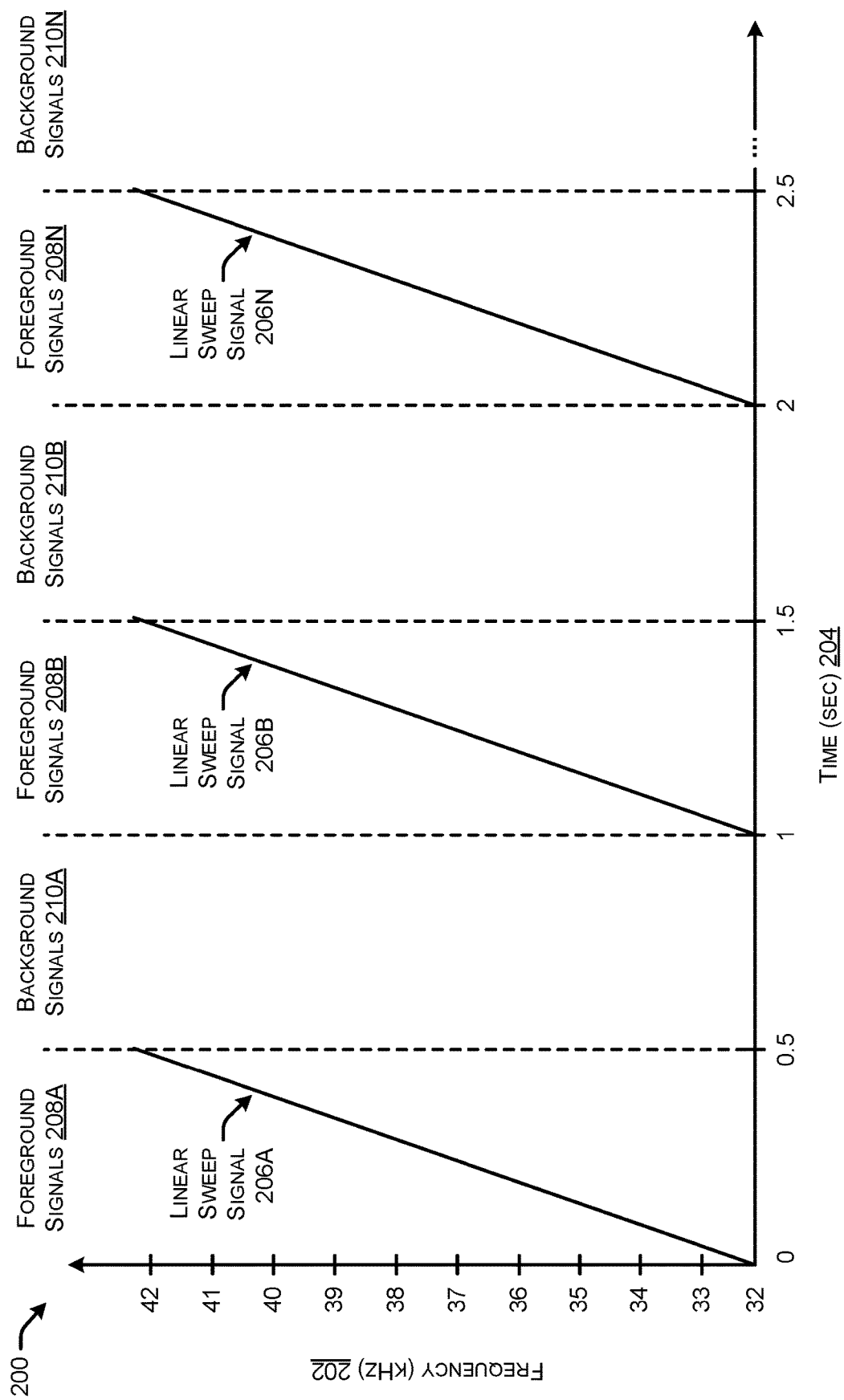
FIG. 2A illustrates an example diagram of linear sweep signals that are used in a calibration process to determine optimal carrier frequencies at which the presence-detection device is to emit ultrasonic signals.

FIG. 2A illustrates an example diagram 200 of linear sweep signals that are used in a calibration process to determine optimal carrier frequencies at which the presence-detection device 104 is to emit ultrasonic signals.

The diagram 200 includes a graph that has frequency (kHz) 202 on the y-axis and time (seconds) 204 on the x-axis. As shown, diagram 200 illustrates multiple ultrasonic sweep signals 114, in this case, linear sweep signals 206A-206N (where "N" is any integer). Although there are three linear sweep signals 206 illustrated, any number of linear sweep signals 206 may be used (e.g., 1, 4, 10, etc.). The linear sweep signals 206 are illustrated as being included in foreground signals 208A-208N, where the foreground signals 208 also include background noise in the environment 102. That is, during the periods of time corresponding to the foreground signals 208, a microphone 112 may generate audio data that represents the linear sweep signals 206 as well as background noise from the environment 102. As illustrated, the linear sweep signals 206 may be output for 500 ms, and ramp up from 32 kHz to 42 kHz. However, these values are merely illustrative and different frequency spans and different emission times may be used. During the background signal portions 210A-210N, the presence-detection device 104 may refrain from emitting sound using the loudspeaker 110 such that any noise signals received by the microphone(s) 112 is background noise from the environment 102 and other noise sources in the environment 102.

Figure 2B:
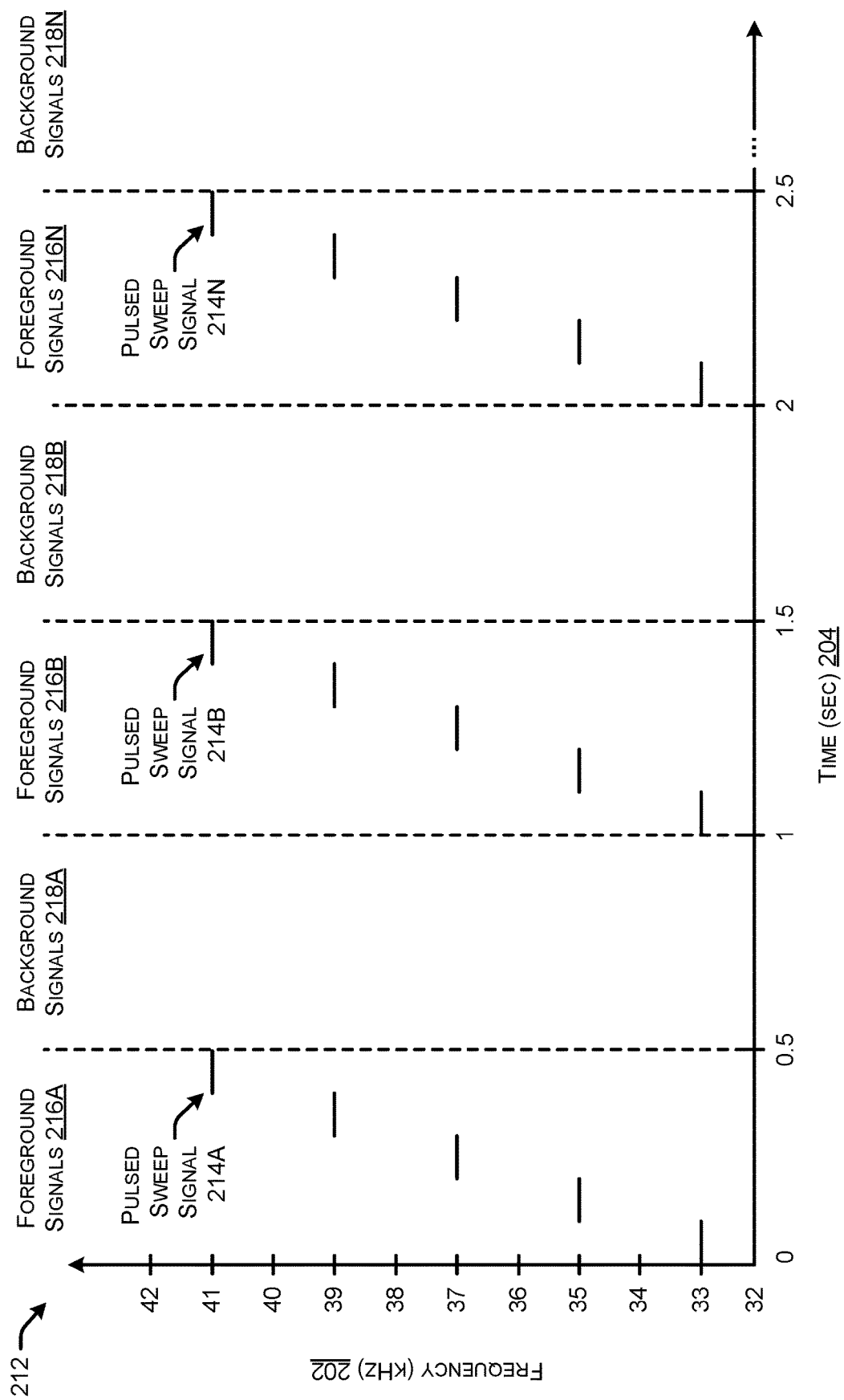
FIG. 2B illustrates an example diagram of pulsed sweep signals that are used in a calibration process to determine optimal carrier frequencies at which the presence-detection device is to emit ultrasonic signals.

FIG. 2B illustrates an example diagram 212 of pulsed sweep signals 214 that are used in a calibration process to determine optimal carrier frequencies at which the presence-detection device 104 is to emit ultrasonic signals. Rather than using a linear ramp signal for the ultrasonic sweep signal 114, the presence-detection device 104 may use pulsed sweep signals 214A-214N. Generally, the pulsed sweep signals 214 may be at, or near, candidate carrier frequencies for the presence-detection device 104.

The diagram 200 includes a graph that has frequency (kHz) 202 on the y-axis and time (seconds) 204 on the x-axis. As shown, diagram 200 illustrates multiple pulsed sweep signals 214A-214N. Although there are three pulsed sweep signals 214 illustrated, any number of linear sweep signals 206 may be used (e.g., 1, 4, 10, etc.). The pulsed sweep signals 214 are illustrated as being included in foreground signals 216A-216N, where the foreground signals 216 also include background noise in the environment 102. That is, during the periods of time corresponding to the foreground signals 216, a microphone 112 may generate audio data that represents the pulsed sweep signals 214 as well as background noise from the environment 102. As illustrated, the pulsed sweep signals 214 may be output for 100 ms for each pulse and for a total of 500 ms, and ramp up from 33 kHz to 41 kHz. However, these values are merely illustrative and different frequency spans and different emission times may be used. During the background signal portions 218A-218N, the presence-detection device 104 may refrain from emitting sound using the loudspeaker 110 such that any noise signals received by the microphone(s) 112 is background noise from the environment 102 and other noise sources in the environment 102.

When using the pulsed sweep signals 214, the presence-detection device 104 may determine SNR values using matched filter techniques where the audio data representing the foreground signals 216 is processed such that the direct path is removed or attenuated from the audio data, and the reflected/reverberated signals remain represented in the audio data. That is, the presence-detection device 104 may separate the pulsed sweep signals 214 (or "direct path") from the reverberated/reflected signals based on different time-of-arrival delay.

Figure 2C:
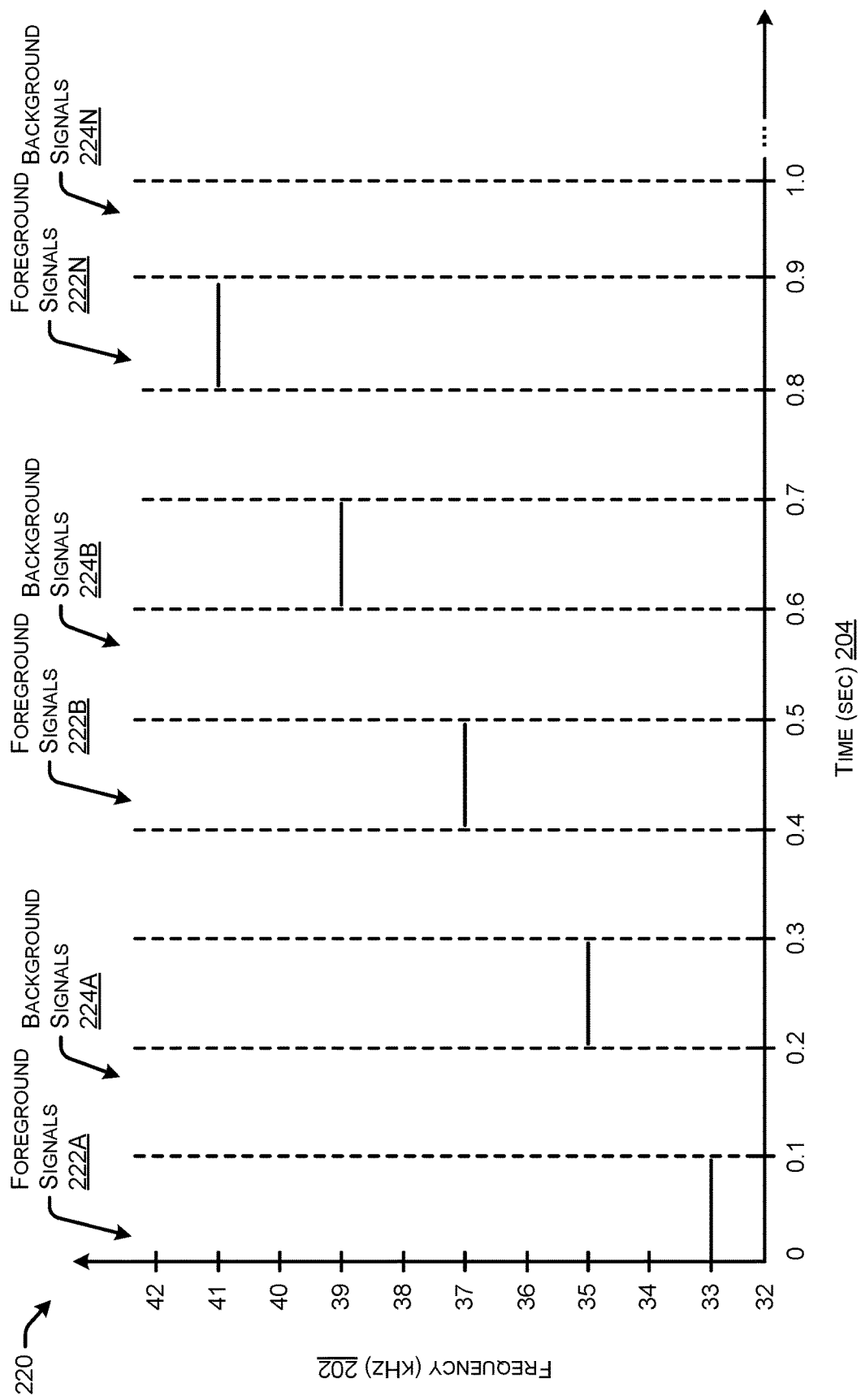
FIG. 2C illustrates another example diagram of pulsed sweep signals that are used in a calibration process to determine optimal carrier frequencies at which the presence-detection device is to emit ultrasonic signals.

FIG. 2C illustrates another example diagram 220 of pulsed sweep signals that are used in a calibration process to determine optimal carrier frequencies at which the presence-detection device 104 is to emit ultrasonic signals. Rather than using a linear ramp signal for the ultrasonic sweep signal 114, the presence-detection device 104 may use pulsed sweep signals. Generally, the pulsed sweep signals may be at, or near, candidate carrier frequencies for the presence-detection device 104.

The diagram 200 includes a graph that has frequency (kHz) 202 on the y-axis and time (seconds) 204 on the x-axis. As shown, diagram 200 illustrates multiple pulsed sweep signals. Although there are five pulsed sweep signals illustrated, any number of linear sweep signals 206 may be used (e.g., 1, 4, 10, etc.). The pulsed sweep signals are illustrated as being included in foreground signals 222A-222N, where the foreground signals 222 also include background noise in the environment 102. That is, during the periods of time corresponding to the foreground signals 222, a microphone 112 may generate audio data that represents the pulsed sweep signals as well as background noise from the environment 102. As illustrated, the pulsed sweep signals may be output for 10 ms for each pulse, and increase or ramp up from 33 kHz to 41 kHz. However, these values are merely illustrative and different frequency spans and different emission times may be used. During the background signal portions 224A-224N, the presence-detection device 104 may refrain from emitting sound using the loudspeaker 110 such that any noise signals received by the microphone(s) 112 is background noise from the environment 102 and other noise sources in the environment 102.

As illustrated in FIG. 2C, the pulsed signals may be emitted for 10 ms, followed by a period of 10 ms where background signals 224 are detectable. Thus, the ultrasonic sweep signal may include pulsed signals that are spaced by portions of time (background signals 224) where the loudspeaker 110 is not emitting sound (or not emitting ultrasonic sound). In this way, the background signals 224 may be generated in between pulsed signals where the foreground signals 222 are emitted.

When using the pulsed sweep signals, the presence-detection device 104 may determine SNR values using matched filter techniques where the audio data representing the foreground signals 222 is processed such that the direct path is removed or attenuated from the audio data, and the reflected/reverberated signals remain represented in the audio data. That is, the presence-detection device 104 may separate the pulsed sweep signals (or "direct path") from the reverberated/reflected signals based on different time-of-arrival delay.

Figure 3:
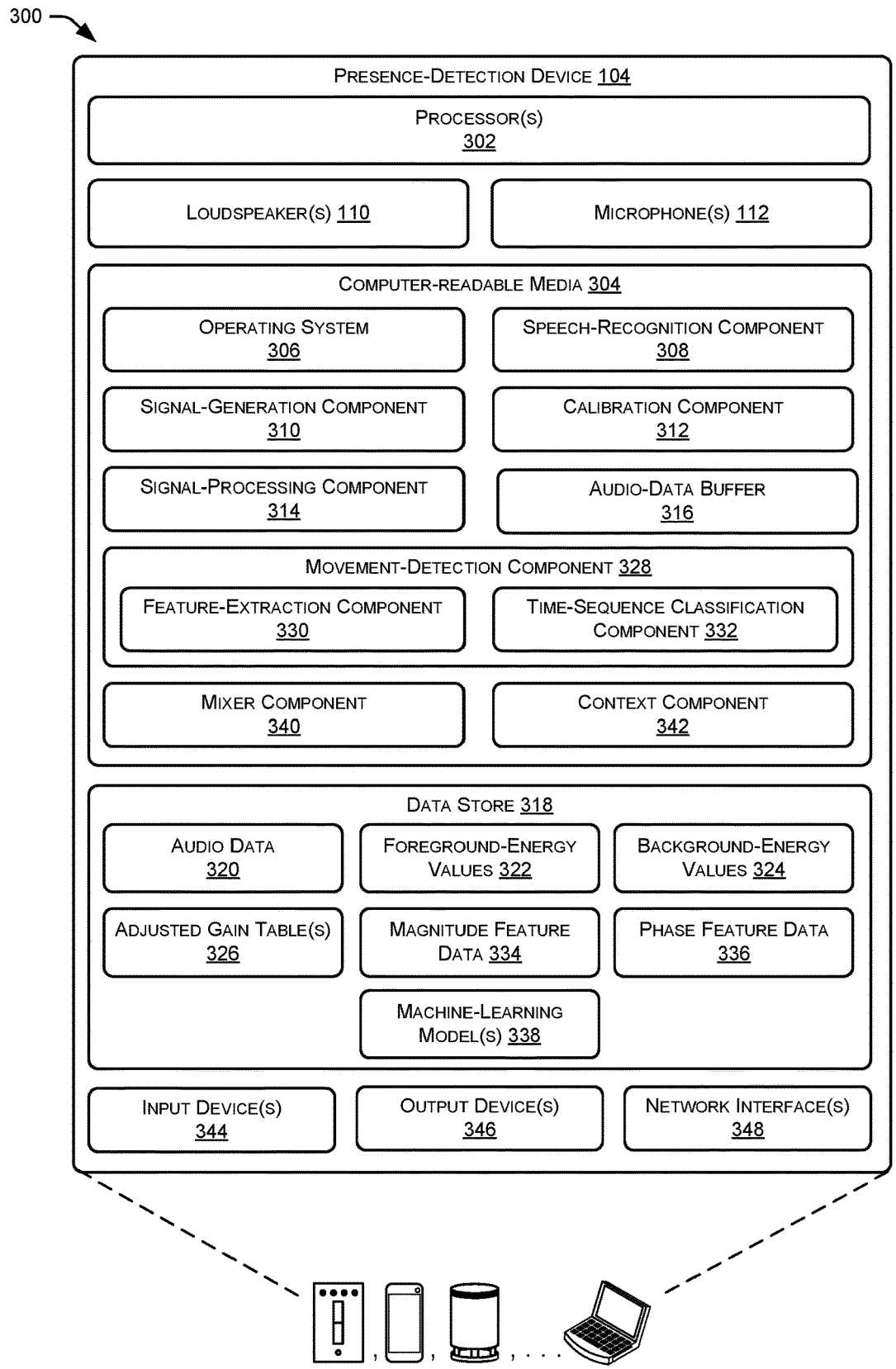
FIG. 3 illustrates an example configuration of components of a presence-detection device.

FIG. 3 illustrates an example configuration of components of a presence-detection device 104. Generally, the presence-detection device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

The presence-detection device 104 may include one or more processors 302 configured to execute various computer-executable instructions stored on the presence-detection device 104. Further, the presence-detection device 104 may include one or more loudspeakers 110 positioned at one or more locations on the presence-detection device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the presence-detection device 104.

The presence-detection device 104 may further include the one or more microphones 112, which may be a microphone array 112 that comprises multiple microphones 112 which may include transducers that convert sound into an electrical audio signal. The microphone(s) 112 may include any number of microphones that are arranged in any pattern. For example, the microphone(s) 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphone(s) 112 may be in a planar configuration, or positioned apart in a non-planar three-dimensional region. In some implementations, the microphone(s) 112 may include a spatially disparate array of sensors in data communication. For example, a networked array of sensors may be included. The microphone(s) 112 may include omni-directional microphones, directional microphones (e.g., shotgun microphones), and so on.

The presence-detection device 104 may further include computer-readable media 304 that may be used to store any number of software and/or hardware components that are executable by the processor(s) 300. Software components stored in the computer-readable media 304 may include an operating system 306 that is configured to manage hardware and services within and coupled to the presence-detection device 104. The computer-readable media may store a speech-recognition component 308 that, when executed by the processor(s) 302, perform speech-recognition on processed audio signal(s) to identify one or more voice commands represented therein. For instance, the speech-recognition component 308 may convert the audio signals into text data using automatic-speech recognition (ASR), and determine an intent for voice commands of the user 106 using natural-language understanding (NLU) on the text data. Thereafter, a command processor, stored in the computer-readable media 304 (and/or at a remote network-based system), may cause performance of one or more action in response to identifying an intent of the voice command. In the illustrated example, for instance, the command processor may issue an instruction to control a secondary device 108. For instance, the command processor may issue one or more instructions to the television 108(1) to show the weather channel, sends an instruction to dim the light 108(2), and/or output music using a loudspeaker 110.

The computer-readable media 304 may further store a signal-generation component 310 that, when executed by the processor(s) 302 generate audio signals/data that represent sound to be output by the loudspeaker(s) 110. The signal-generation component 310 may, for example, generate audio data representing ultrasonic signals that are output by the loudspeaker(s) 110 at a frequency that is above the audible range of humans. The signal-generation component 310 may generate ultrasonic signals at various power levels depending on, for example, a size of a room that the presence-detection device 104 is in. Further, the signal-generation component 310 may generate ultrasonic signals that are converted into sound by the loudspeaker(s) 110 according to various timing implementations, such as a continuously emitted signal, a pulsed sound, a periodically pulsed sound, etc. In some examples, the signal-generation component 310 may be configured to generate a calibration signal, such as an audio sweep signal, to determine audio characteristics of a room or other environment of the presence-detection device 104.

The computer-readable media 304 may further store a calibration component 312 configured to, when executed by the processor(s) 302, determine audio characteristics of an environment of the presence-detection device 104 and/or carrier frequencies at which to output sound by the loudspeaker(s) 110. In some examples, the calibration component 312 may cause the signal-generation component 310 to generate audio data representing a calibration tone, such as an ultrasonic sweep signal, to determine audio characteristics of the environment of the presence-detection device 104. The calibration component 312 may perform device calibration to determine an optimal frequency range for ultrasonic signals to be emitted by the loudspeaker(s) 110 into the environment. In some examples, the calibration component 312 may cause the signal-generation component 310 to generate an ultrasonic sweep signal that, when converted into sound by the loudspeaker(s) 110, emits a sound over a period of time at a range of ultrasonic frequencies (e.g., 27 kHz-42 k Hz). The calibration component 312 may also activate at least one microphone in the microphone(s) 112 to generate audio data representing the ultrasonic sweep signal, and determine an optimal frequency range/bin for the environment. For instance, the calibration component 312 may analyze various frequency ranges included in the total frequency range of the ultrasonic sweep signal and determine signal-to-noise (SNR) values for one or more frequency ranges. The calibration component 312 may determine which sub-frequency range in the total frequency range of the ultrasonic sweep signal has the best SNR value.

In some examples, the calibration component 312 may cause utilize the ultrasonic sweep signal upon installation of the presence-detection device 104, after detecting movement, or the end of movement, using a sensor of the presence-detection device 104, and/or periodically in order to determine an optimal frequency at which to emit ultrasonic signals into an environment of the presence-detection device 104.

In some examples, the calibration component 312 may perform more passive techniques for determining acoustic characteristics of an environment of the presence-detection device 104. For instance, the calibration component 312 may, at least periodically, simply utilize at least one microphone in the microphone(s) 112 to generate audio data while the loudspeaker(s) 110 is not outputting sound. The calibration component 312 may analyze that audio data to determine background noise or sound in the environment of the presence-detection device 104. In this way, the calibration component 312 may detect noise that may be caused by other objects in the environment (e.g., television, ceiling fan, vacuum cleaner, etc.) that may interfere with analyzing audio data representing ultrasonic signals. In this way, the calibration component 312 may determine a background noise profile or signature that may later be used to help identify portions of audio data that represent reflections of the ultrasonic signal, rather than background noise. The calibration component 312 may provide an indication of a frequency at which to emit ultrasonic signals to the signal-generation component 310 in order to generate audio data/signals that represent the ultrasonic signals when converted by the loudspeaker(s) 110. In this way, the loudspeaker(s) 110 may emit ultrasonic signals that are at a more optimized frequency range based on audio characteristics of the environment.

The computer-readable media 304 may further include a signal-processing component 314 that, when executed by the processor(s) 302, perform various operations for processing audio data/signals generated by the microphone(s) 112. For example, the signal-processing component 314 may include components to perform low-pass filtering and/or high-pass filtering to ensure that speech and other sounds in the spectrum region of the ultrasonic signal does not affect baseband processing. For instance, the signal-processing component 314 may performing high-pass filtering for the audio data received in each audio channel for respective microphones 112 to remove sounds at lower frequencies that are outside or lower than of the frequency range of the ultrasonic signal and/or reflected signals that have shifted, such as speech (e.g., 100 Hz, 200 Hz, etc.) or other sounds in the environment. Further, the signal-processing component 314 may perform baseband carrier shifts (e.g., at 96 kHz) to shift or modulate the audio signal back to baseband frequency from the carrier frequency (e.g., 46 kHz, 21 kHz, etc.). Additionally, the signal-processing component 314 may perform low-pass filtering for each audio signal generated by each microphone in the array 112 after the baseband carrier shift to remove signals from the audio signals that are higher than a certain cutoff frequency that is higher than audio signals representing the ultrasonic signal (e.g., a cutoff frequency of than 30 kHz, 33 kHz, 35 kHz, and/or any other cutoff frequency higher than the ultrasonic signal frequency range).

In some examples, the signal-processing component 314 may perform integer down sampling, such as digital sampling, to remove certain samples from the audio signals. For example, the signal-processing component 314 may perform any form of digital down sampling or decimation to reduce the sampling rate of the audio signals, such as down sampling at a rate of 2 kHz (or another appropriate frequency). In this way, the signal-processing component 314 may produce an approximation or representation of the audio signals generated by the microphone(s) 112, but at a lower frequency rate. After down sampling the audio signals, the signal-processing component 314 may perform various signal processing, such as windowing, Fourier Transformations, and/or logarithmic transformations. For example, the signal-processing component 314 may perform various types of transforms to convert the audio signal from the time domain into the frequency domain, such as a Fourier transform, a fast Fourier transform, a Z transform, a Fourier series, a Hartley transform, and/or any other appropriate transform to represent or resolve audio signals into their magnitude (or amplitude) components and phase components in the frequency domain. Further, the signal-processing component 314 may utilize any type of windowing function on the audio data, such as the Hanning Window, the Hamming Window, Blackman window, etc. Additionally, the signal-processing component 314 may perform a logarithmic transform on the magnitude components to transform the magnitude components of the frequency of the reflected signal. For instance, due to the high-dynamic range of the magnitude components of the frequency of the reflected ultrasonic signal, and because the amount of reflection that occurs from movement of the user 106 is relatively small (may appear similar to noise), the logarithmic transform may transform the magnitude components into a larger range. After applying a logarithmic transform to the magnitude components, the change in magnitude caused by the reflection of the ultrasonic signal off of the moving object, or person, will be more easily identifiable.

In this way, the signal-processing component 314 may generate magnitude components and phase components that represent the frequency components (magnitude and phase) of the audio signals that represent reflected signals that correspond to the ultrasonic signal. Generally, the magnitude components and phase components may be complex numbers that represent the audio signals at each frequency. Thus, the magnitude components and phase components may represent frequency content for audio signals from each audio channel generated by the microphone(s) 112 after various digital processing has been performed on the audio signals by the signal-processing component 314. The magnitude components may be represented as logarithmic values (dB), and the phase components may be represented by radian and/or degree values. In this way, the signal-processing component 314 may generate magnitude components and phase components representing audio signals generated by two or more microphones in the microphone(s) 112 over a period of time (e.g., 8 seconds).

The presence-detection device 104 may further include a data store 318, which may comprise any type of storage (e.g., Random Operating Memory (ROM), disk storage, drive storage, Random-Access Memory (RAM), and/or any other type of storage). The data store 318 may store audio data 320 that represents sound, waves, signals, etc., that have been received by the microphone(s) 112. The audio data 320 may be of any type or types of audio file format usable for storing digital and/or analog audio data on a computer system. The data store 318 may also store foreground-energy values 322, which may represent energy of the foreground signals in any format indicative of power and/or energy of the foreground signals (e.g., decibels (dB), dB of sound pressure level (dB SPL), dB of hearing level (dB HL), etc.). Similarly, the data store 318 may also store background-energy values 324, which may represent energy of the background signals in any format indicative of power and/or energy of the background signals (e.g., decibels (dB), dB of sound pressure level (dB SPL), dB of hearing level (dB HL), etc.). the data store 318 may further store one of more adjusted gain tables 326. As described in more detail with respect to FIG. 6B, the adjusted gain table(s) 326 may generally represent gain values that are applied to the loudspeaker 110 based on the optimized carrier frequency at which the loudspeaker 110 is emitting ultrasonic signals.

The computer-readable media 304 may further store a feature-extraction component 330 that, when executed by the processor(s) 302, cause the processor(s) to extract the magnitude feature data 334 and phase feature data 336 from the magnitude and phase components generated by the signal-processing component 314. The feature-extraction component 330 may perform various operations for normalizing and stacking features of the magnitude components and phase components for each audio channel from the microphone(s) 112. For example, the feature-extraction component 330 may receive the complex numbers (e.g., magnitude components and phase components) and remove the first order statistics. Further, the feature-extraction component 330 may perform feature stacking to stack the magnitude components across N time intervals to create magnitude feature data 334, and stack the phase components to create phase feature data 336. In some examples, the feature-extraction component 330 may create the phase feature data 336 may determining differences between phase components of the different audio channel paths from the microphones of the array 112.

In some examples, the feature-extraction component 330 may further perform normalization and remove background noise. For instance, the presence-detection device 104 may, at least periodically, activate one or more microphones in the array 112 to generate audio signals representing background noise in an environment of the presence-detection device 104. The components of the presence-detection device 104 may analyze the background audio signal(s) representing the background noise, and the feature-extraction component 330 may further create background audio data which represents the background noise. Thus, once the feature-extraction component 330 has generated the magnitude feature data 334 and/or the phase feature data 336, the feature-extraction component 330 may utilize the background audio data to subtract, or otherwise remove, the representation of the background noise from the magnitude feature data 334 and/or the phase feature data 336. In this way, the feature-extraction component 330 may cause the background noise, such as a ceiling fan, a television, a refrigerator, etc., to not be represented in or by the magnitude feature data 334 and/or the phase feature data 336.

In some examples, the magnitude feature data 334 and the phase feature data 336 may generally represent binned frequency features over time, such as 1 dimensional binned frequency features over time that represent reflections of the ultrasonic signal. In various examples, the phase feature data 336 may comprise phase differences between multiple microphones, such as a phase difference between phase components of audio data generated at least in part by the respective microphones 112.

The computer-readable media 304 may further store a time-sequence classification component 332 configured to, when executed by the processor(s) 302, input the magnitude feature data 334 and the phase feature data 336 into one or more machine-learning model(s) 332 in order to classify the magnitude feature data 334 and/or phase feature data 336 as indicating movement of an object in the environment, a direction of the movement, and/or a number of objects moving in the environment. The machine-learning (ML) model(s) 338 may comprise any type of ML model(s) 338 (e.g., neural networks, linear regression, decision tree, Naïve Bayes, etc.) that may be trained to receive magnitude feature data 334 and phase feature data 336 as inputs, and determine outputs indicating whether the magnitude feature data 334 and phase feature data 336 represent movement of an object, a direction of that movement, and/or a number of objects moving.

The time-sequence classification component 332 may further perform various techniques to train the ML model(s) 338. For instance, an ML model(s) 338, such as a neural network, may be trained with training data (e.g., magnitude feature data 334 and phase feature data 336) that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the ML model(s) 338 may be trained to identify input feature vector as representing reflections of ultrasonic signals that reflected off a moving object, or that did not reflect off a moving object.

Further, the ML model(s) 338 may additionally be trained to identify the direction of movement of the object through the environment. The microphone(s) 112 may include multiple microphones that generate, or otherwise are used to create, multi-channel feature data for frequency components of the reflection of the ultrasonic signal, such as phase components and phase feature data 336. The ML model(s) 338 may be trained using phase feature data 336 representing the phase components, or phase feature data 336 representing differences between the phase components, from multiple microphones 112. For instance, the ML model(s) 338 may be trained to identify, based on a comparison between phase components representing the reflection of the ultrasonic signal detected by two different microphones 112, a direction of the object as it moves through the environment.

In even further examples, the ML model(s) 338 may be trained to determine a number of people in the environment that are moving. As an example, the microphone(s) 112 in the presence-detection device 104 may include multiple microphones to generate, at least partly using various components of the presence-detection device 104, phase feature data 336, the model(s) 338 may identify, from the differences in phase components for audio signals generated by multiple microphones represented in the phase feature data 336, movement at various angles (in degrees or radians) that indicate multiple objects moving. For example, the phase feature data 336 may indicate that movement is detected at substantially 180 degrees from a defined axis of the array 112, and also at substantially 30 degrees from the defined axis. The ML model(s) 338 may be trained to determine that, if the difference in the angles are large enough, or over a threshold difference, multiple objects must be moving in the environment rather than one large object.

The computer-readable media 304 may further store a context component 342 configured to, when executed by the processor(s) 302, aggregate and communicate various contextual information between components. For example, the context component 342 may receive, and potentially further analyze, calibration data received from the calibration component 312, such as environment calibration data and/or device calibration data.

Further, the context component 342 may further receive classification results data from the time-sequence classification component 332. For example, the time-sequence classification component 332 and/or the ML model(s) 338 may analyze the magnitude feature data 334 and the phase feature data 336 and output confidence scores associated with one or more of (i) detecting movement of an object, (ii) detecting a direction of the movement, and (iii) detecting one or multiple objects moving in the environment of the presence-detection device 104. The context component 342 may be configured to determine if those confidence scores are above or below threshold values, and also determine actions for the presence-detection device 104 to perform based on the confidence scores being above or below threshold values. Generally, the threshold values may be associated with confidence values that indicate a high-degree, or sufficiently high-degree, of certainty that movement was detected, a direction of the movement, and/or that multiple objects were detected as moving. For instance, if the ML model(s) 338 outputs confidence scores that are higher than an 85% chance that movement was detected, the context component 342 may confirm or determine that movement was in fact detected and perform various operations. The confidence threshold values may be adjusted as desired, such as to err on various sides of detecting movement, or not detecting movement. For instance, the context component 342 may have fairly high threshold values in order to prevent the presence-detection device 104 from performing operations in instances where movement was incorrectly identified due to a lower threshold value.

The computer-readable media 304 may further store an audio-player component configured to, when executed by the processor(s) 302, cause the processor(s) 302 to play audio such as music songs or other audio files. The audio-player component may cause audio data to be provided to the loudspeaker(s) 110 to be converted into sound. In some examples, prior to providing the audio data to the loudspeaker(s) 110, the audio data may be stored in an audio-data buffer 316. In such examples, a mixer component 340 may analyze the audio data stored in the audio-data buffer 316 and determine how to mix the audio data, such as music data, with audio data representing the ultrasonic signal such that the output sound does not experience saturation.

The presence-detection device 104 may comprise any type of portable and/or fixed device and include one or more input devices 344 and output devices 346. The input devices 344 may include a keyboard, keypad, lights, mouse, touch screen, joystick, control buttons, etc. The output devices 346 may include a display, a light element (e.g., LED), a vibrator to create haptic sensations, or the like. In some implementations, one or more loudspeakers 110 may function as output devices 346 to output audio sounds.

The presence-detection device 104 may have one or more network interfaces 348 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols. The network interface(s) 348 may enable communications between the presence-detection device 104 and the secondary devices 108, as well as other networked devices. Such network interface(s) can include one or more network interface controllers (NICs) or other types of transceiver devices to send and receive communications over a network.

For instance, the network interface(s) 348 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 348 may include a wide area network (WAN) component to enable communication over a wide area network. The networks may represent an array of wired networks, wireless networks, such as WiFi, or combinations thereof.

Figure 4:
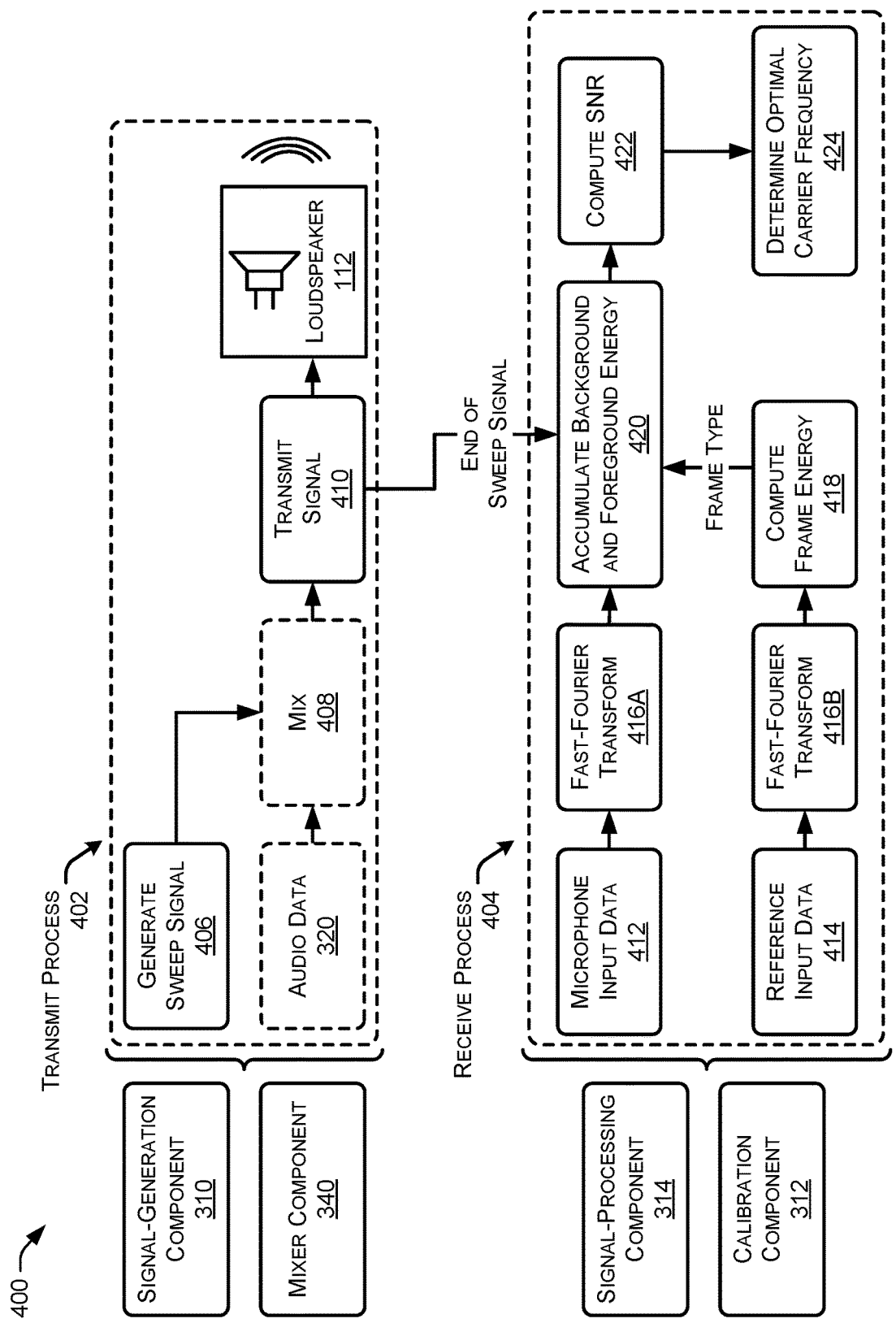
FIG. 4 illustrates an example high-level process for emitting an ultrasonic sweep signal into an environment, and analyzing audio data representing reflections of the ultrasonic sweep signal off objects in the environment to determine an optimal carrier frequency.

FIG. 4 illustrates an example high-level process for emitting an ultrasonic sweep signal 114 into an environment 102, and analyzing audio data 320 representing reflections of the ultrasonic sweep signal 114 off objects in the environment 102 to determine an optimal carrier frequency. FIG. 4 includes a transmit process 402 for transmitting the ultrasonic sweep signal 114, and a receive process 404 for receiving reflected ultrasonic signals 122.

In the transmit process 402, the signal-generation component 310 may generate an ultrasonic sweep signal 114 at 406. The ultrasonic sweep signal 114 may generally span multiple different frequencies that are in the ultrasonic range, or frequency ranges that are inaudible to humans (e.g., frequencies above 20 kilo Hertz (kHz)). As an example, the ultrasonic sweep signal includes multiple different frequencies in between 30 kHz and 42 kHz. In an example, the ultrasonic sweep signal 114 may be a linear sweep signal that ramps up from 30 kHz to 42 kHz over a period of time (e.g., 500 milliseconds (ms)).

In some instances, the transmit process 402 may include a mix step at 408 where audio data 320 is mixed with the ultrasonic sweep signal 114. For instance, the presence-detection device 102 may be outputting audio data 320 that represents music audio data, or other audio data in a human-audible frequency range. The mixer component 340 may be configured to determine how to mix the music audio data with the ultrasonic sweep signal audio data in such a way that saturation is avoided. However, in some instances the mix step 408 may be omitted and the ultrasonic sweep signal 114 may be the only sound output by the loudspeaker 110.

At 410, the signal-generation component 310 may transmit the resulting signal to the loudspeaker 112, and the loudspeaker 110 may emit at least one or more ultrasonic sweep signals 114 into the environment 102 of the presence-detection device 104. Further, the signal-generation component 310 may signal the end of the sweep signal to the signal-processing component 314 for use in the receive process 404.

In the receive process 404, the signal-processing component 314 may utilized microphone input data 412 (e.g., audio data 320 representing reflected ultrasonic signals 122 and any background noise) as well as reference input data 414. The reference input data 414 may correspond to audio data representing the ultrasonic sweep signal 114 such that the reference input data 414 indicates timing according to which the microphone input data 412 represents foreground signals 208 and background signals 210.

The microphone input data 412 may be transformed using a fast-Fourier transform 416A, and the reference input data 414 may also be input in a fast-Fourier transform 416B. For example, the signal-processing component 314 may perform various types of transforms to convert the audio data 412/313 from the time domain into the frequency domain, such as a Fourier transform, a fast Fourier transform, a Z transform, a Fourier series, a Hartley transform, and/or any other appropriate transform to represent or resolve the audio data 412/414 into their magnitude (or amplitude) components and phase components in the frequency domain.

At 418, the signal-processing component 314 may compute frame energy 418 for frames of the reference input data 414. The signal-processing component 314 may compute the energy at each frame and if the energy is above a threshold energy value, the frame represents foreground signals 208, and if the energy is below a threshold energy value, then the frame represents background signals 210. The signal-processing component 314 may provide indications as to the frame type to the step 420.

At 420, the signal-processing component 314 may accumulate background energy and foreground energy from the microphone input data 412 based on the frame type. Thus, when the frame type indicates foreground energy, the energy from the microphone input data 412 is stored as foreground-energy values 322. Conversely, when the frame type indicates background energy, the energy from the microphone input data 412 is stored as background-energy values 324.

At 422, the signal-processing component 314 computes the SNR values for each frequency range of the total frequency range in the ultrasonic sweep signal 114. That is, the background-energy values 324 may be used to attenuate or remove the noise signal representation from the foreground-energy values 322, and the SNR values may then be determined by dividing the foreground-energy values 322 by the background-energy values 324. At 424, the calibration component 312 may determine the optimal carrier frequency. For instance, the calibration component 312 may select a carrier frequency that is within a frequency range with the highest SNR value, or one of the highest SNR values.

FIG. 5 illustrates an example diagram 500 depicting variations in signal-to-noise ratio (SNR) values in sensor data generated by different microphones 112 for a range of carrier frequencies. As illustrated, the diagram 500 has SNR values 502 on the y-axis, and frequency values 504 on the x-axis.

The diagram 500 illustrates the SNR values for 4 different microphones 112 across a sweep frequency range of 32 kHz to over 40 kHz. As illustrated, the SNR values for the 4 different microphones vary significantly over the frequency range 504. However, when selecting a microphone 112, and/or multiple microphones 112, to receive reflected ultrasonic signals 112, it may be advantageous to use microphone(s) 112 with the highest SNR values in order to identify and isolate the reflected ultrasonic signals 112 without significant noise.

As illustrated, the single mic SNR peak 506, for both mic 1 and mic 2, is around a carrier frequency of roughly 41 kHz or 42 kHz (e.g., roughly SNR values of 52). Thus, in a single, or double, microphone 112 implementation, it would be optimal to use mic 1 or mic 2 to receive reflected ultrasonic signals 112 for an ultrasonic sweep signal 114 at 41 kHz. In an example where all 4 of the microphones 112 are to be used, the mic array SNR peak 508 may be around a carrier frequency of 37.5 kHz where the average SNR values 502 across all 4 microphones 112 is maximized.

Figure 6A:
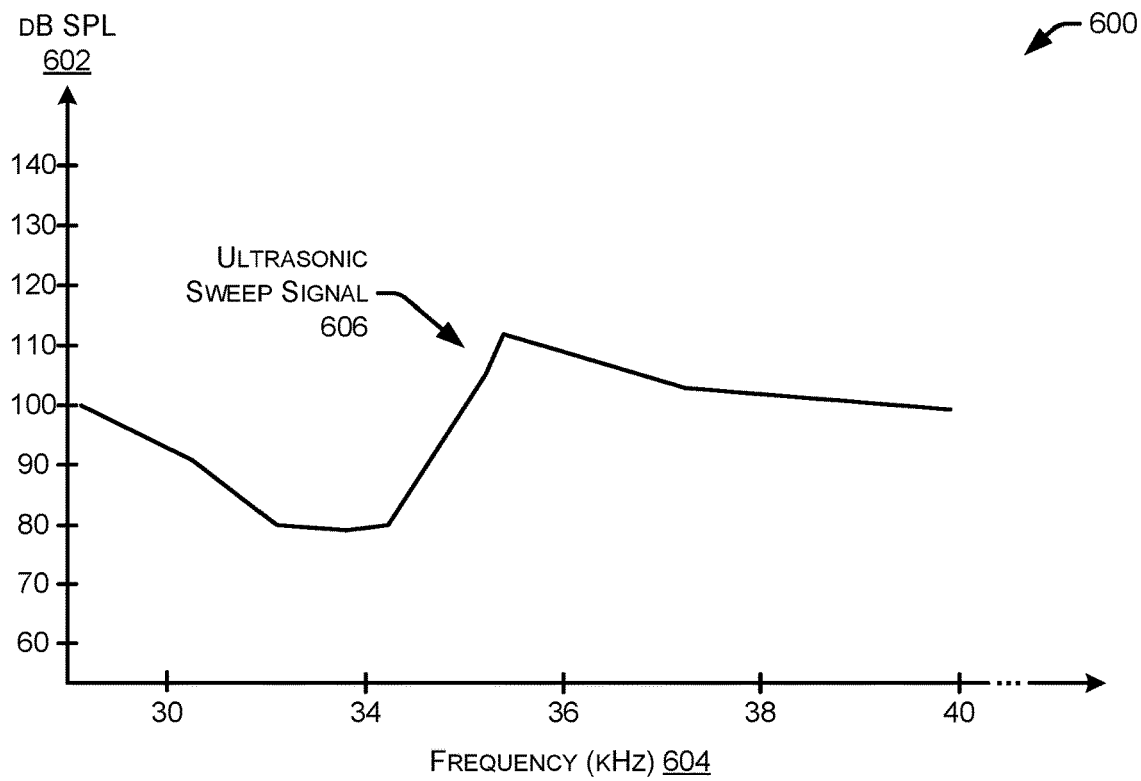
FIG. 6A illustrates an example diagram depicting variations in a power or energy at which a loudspeaker emits an ultrasonic sweep signal over different frequencies.

FIG. 6A illustrates an example diagram 600 depicting variations in a power or energy at which a loudspeaker emits an ultrasonic sweep signal over different frequencies. As illustrated, the y-axis represents dB SPL values 602, and the x-axis may represent frequency values 604 for an ultrasonic sweep signal 606. The dB SPL values 602 may represent the transmission power of the ultrasonic sweep signal 606 by the loudspeaker 110 due to loudspeaker variability. As shown, the dB SPL values 602 for the loudspeaker 110 at 34 kHz is only 80 dB SPL, and the dB SPL values 602 for the ultrasonic sweep signal 606 at 36 kHz is around 10 dB SPL. Thus, the loudspeaker 110 emits the ultrasonic sweep signals 606 at different power levels depending on the carrier frequency 604. Thus, each frequency 604 may have specific gain changes. Accordingly, the gain of the loudspeaker 110 may need to be modified based on the optimized carrier frequency.

Figure 6B:
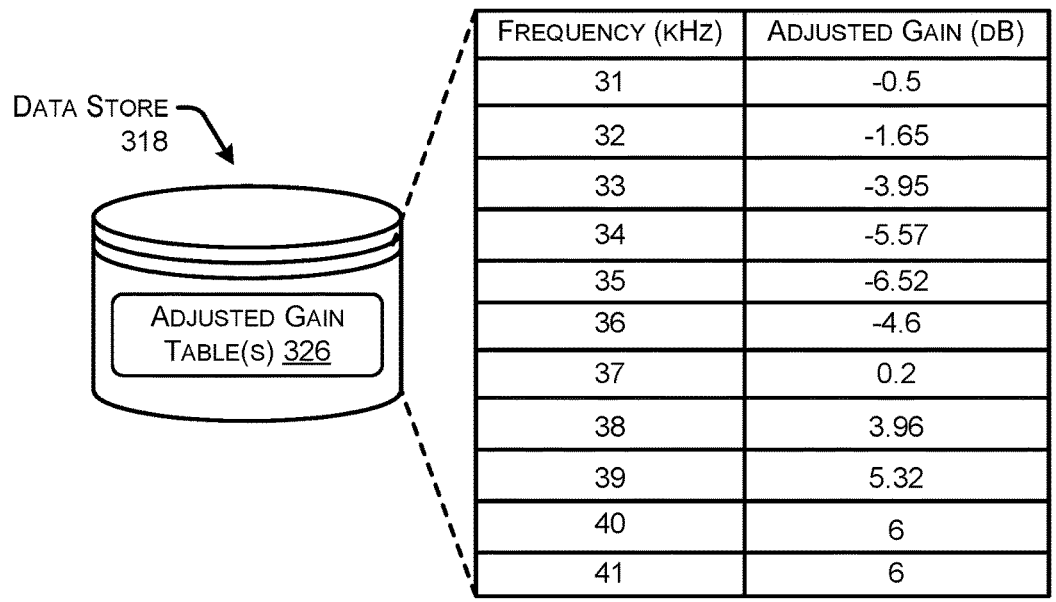
FIG. 6B illustrates an example gain table that is used to adjust the gain of a loudspeaker depending on the carrier frequency at which an ultrasonic signal is being emitted.

FIG. 6B illustrates an example adjusted gain table 326 that is used to adjust the gain of a loudspeaker 110 depending on the carrier frequency at which an ultrasonic signal is being emitted. As illustrated, the adjusted gain table 326 indicates adjust gain values that are to be applied to the loudspeaker 110 in order to result in consistent transmission power level across the different carrier frequencies.

Figure 7A:
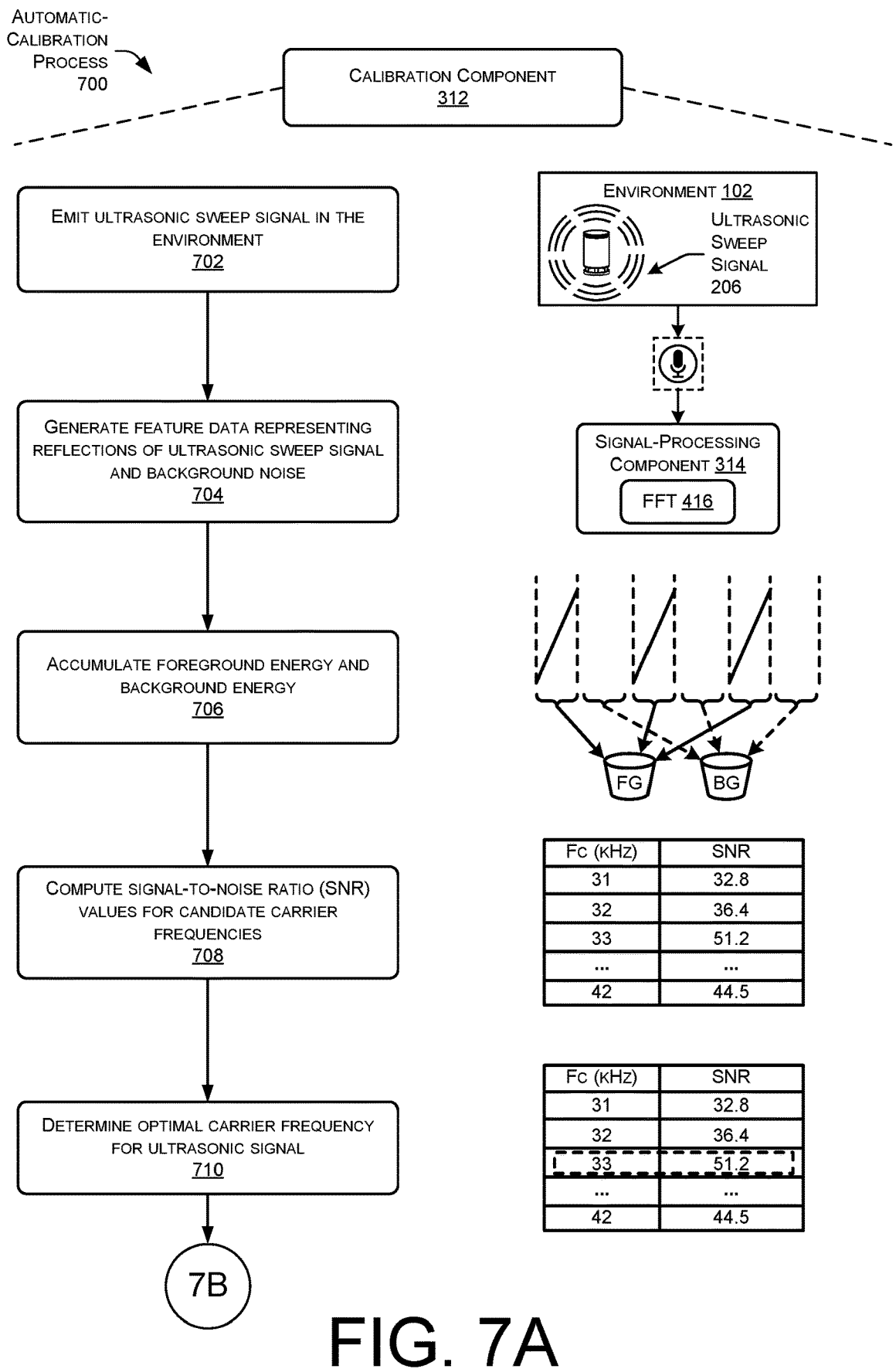
FIGS. 7A and 7B collectively illustrate a flow diagram of an example automatic-calibration process and a user-input calibration process for calibrating the presence-detection device to more accurately detect movement of a user in an environment.
Figure 7B:
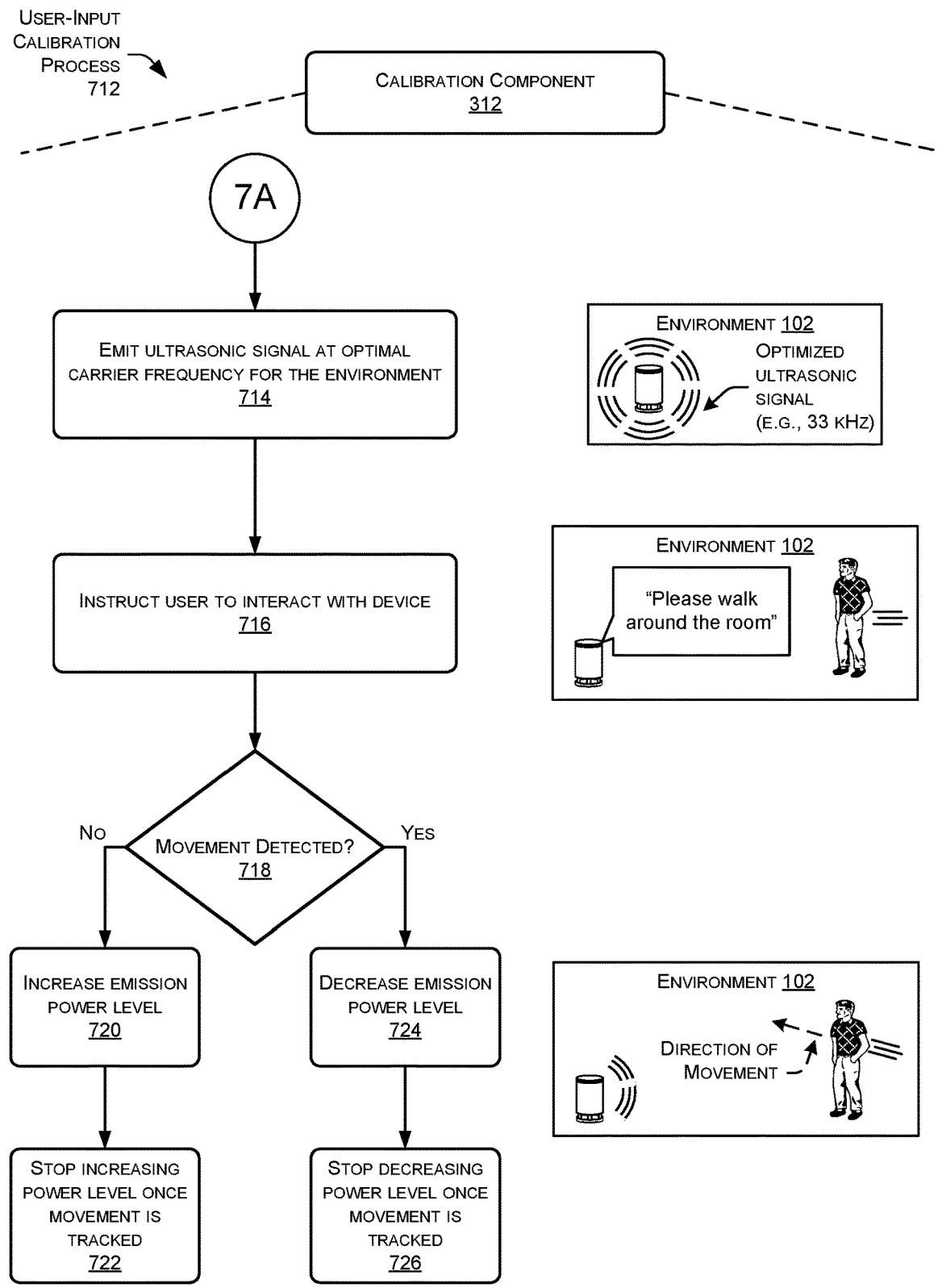

FIGS. 7A and 7B collectively illustrate a flow diagram 700 of an example automatic-calibration process 700 and a user-input calibration process 712 for calibrating the presence-detection device 104 to more accurately detect movement of a user 106 in an environment 102.

At 702, the presence-detection device 102 may use the loudspeaker 110 to emit an ultrasonic sweep signal 114 into the environment 102. For instance, the presence-detection device 102 may cause the loudspeaker 110 to emit a linear sweep signal 206 and/or the pulsed sweep signal 214 into the environment 102.

At 704, the presence-detection device 102 may generate feature data representing reflections of the ultrasonic sweep signal and background noise. For instance, a microphone 112 may be used in combination with a feature-extraction component 330 to generate magnitude feature data 334 that represents reflected ultrasonic signals 122 and background noise.

At 706, the presence-detection device 102 may accumulate foreground energy and background energy. For instance, the signal-processing component 314 may determine frame types of the reference input data 414 in order to identify background and foreground energy, and accumulate the background energy and foreground energy according to multiple difference frequency ranges in the total frequency range.

At 708, the presence-detection device 102 may compute SNR values for candidate carrier frequencies. For instance, the signal-processing component 314 may attenuate the background noise from the foreground-energy values 322, and divide the foreground-energy values 322 by the background-energy values 324.

In some instances, computing the SNR values may include taking into account air absorption of the ultrasonic frequencies. For instance, ultrasonic signals of different frequencies attenuate at different rates when propagating in the air. Accordingly, the presence-detection device 104 may compensate for this attenuation by using air-absorption factors to estimate the reflection signals SNR values. As an example, a 32 kHz signal may attenuate at 1.025 dB for each meter it travels, whereas a 40 kHz signal may attenuate at 1.365 dB for each meter it travels. Accordingly, if a user 106 is moving at 5 meters from the presence-detection device 104, the reflected signals travel 10 meters, and the SNR values computed for the different frequencies may be computed using the air-attenuation values. In this specific example, to compute the SNR values of the reflected signals at 32 kHz, the presence-detection device 104 may add a value of 1.025×10 to noise estimate, and to compute the SNR values of the reflected signals at 40 kHz, the presence-detection device 104 may add a value of 1.365×10 to noise estimate. Accordingly, when calculating the SNR values for the ultrasonic sweep signal, the presence-detection device 104 may take into account, or factor in, the air-attenuation values determined for the different frequencies.

At 710, the presence-detection device 102 may determine an optimal carrier frequency for the ultrasonic signal. For instance, the presence-detection device 102 may identify a carrier frequency from a frequency range with the highest SNR value, or one of the highest SNR values.

At 714, the presence-detection device 102 may emit an ultrasonic signal at the optimal carrier frequency for the environment 714. At 716, the presence-detection device 102 may instruct the user 106 to interact with the presence-detection device 102. For instance, the presence-detection device 102 may instruct the user to walk around the room, and may additionally or alternatively instruct the user 106 to move the presence-detection device 102 around the room and/or change an orientation of the presence-detection device 102.

At 718, the presence-detection device 102 may determine whether movement was detected by using the reflected ultrasonic signals 122. For instance, the presence-detection device 104 may analyze audio data representing reflections of the ultrasonic signals off of the user 106, and if the presence-detection device 104 is not able to detect movement, the presence-detection device 104 may increase the power level at 720 at which the ultrasonic signals are emitted until movement is reliably tracked. Further, the presence-detection device 104 may stop increasing the power level once movement is tracked at 722.

In some examples, the user 106 may be instructed to interact with the presence-detection device 104 based on a desired sensitivity for the user 106. For instance, if the user 106 desires that the presence-detection device 104 be less sensitive (e.g., only detect major movements), then the presence-detection device 104 may request that the user 106 walk around the environment 102 such that the presence-detection device 104 is calibrated to detect walking, or other major movements. Conversely, if the user 106 would like to have more fine-tuned and sensitive, the presence-detection device 104 may request that the user 106 perform movements that are less severe major, such as waving their hand. In that scenario, the presence-detection device 104 is calibrated to detect less severe movements by the user 106.

Alternatively, if the presence-detection device 104 is able to detect the user 106 is walking, the presence-detection device 104 may decrease the power level at which the ultrasonic signals are emitted at 724 until movements of the user 106 are reliably tracked. Further, the presence-detection device 104 may stop decreasing the power level once movement is tracked at 726. In this way, the presence-detection device 104 may use a user-input calibration process 712 to determine an optimal transmission power based on movement characteristics of the user.

Figure 8:
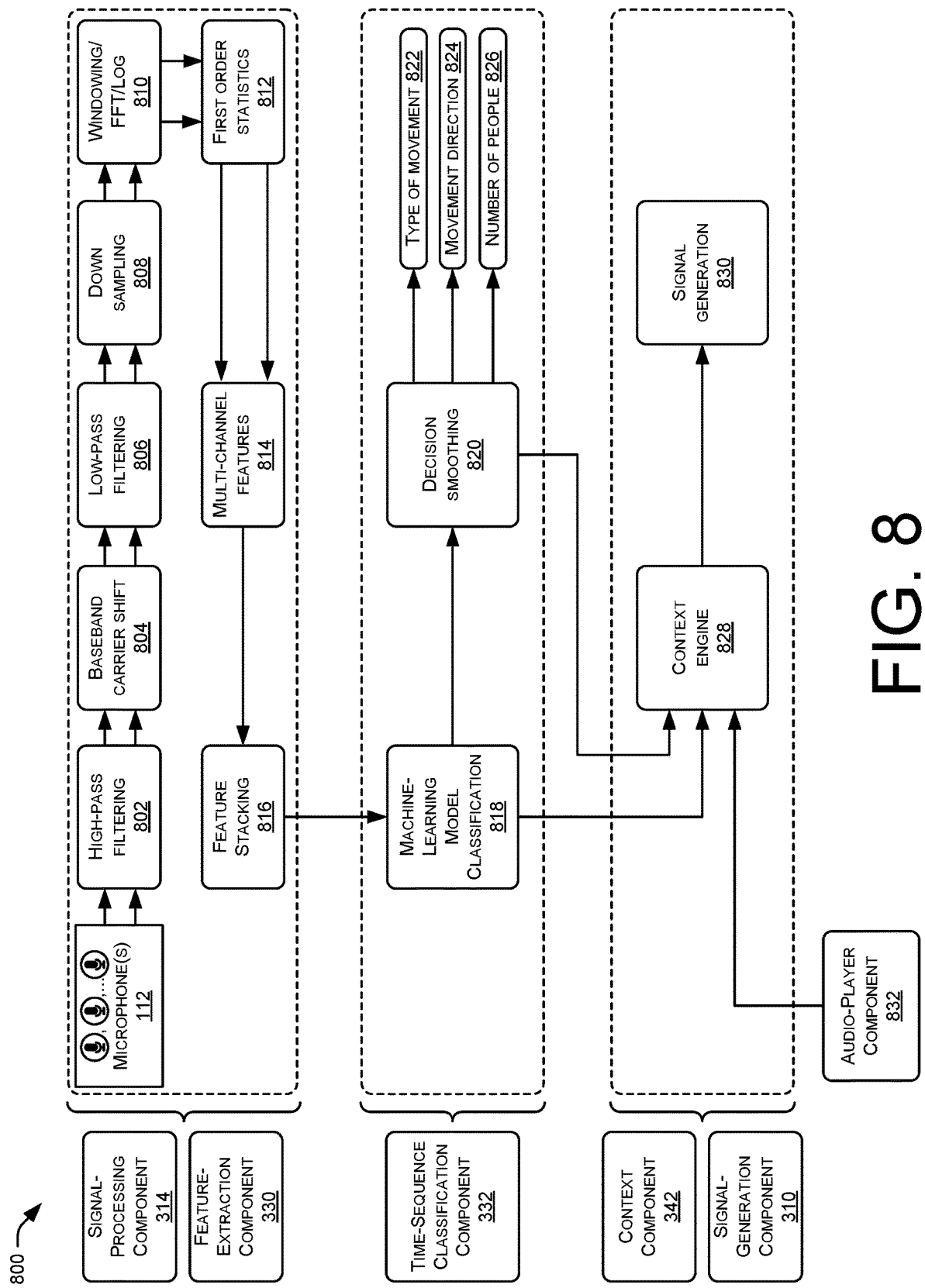
FIG. 8 illustrates an example high-level process for generating and emitting an ultrasonic signal into an environment, and analyzing audio data representing reflections of the ultrasonic signal off objects in the environment to detect presence of a user.

FIG. 8 illustrates an example high-level process 800 for generating and emitting an ultrasonic signal into an environment, and analyzing audio data representing reflections of the ultrasonic signal off objects in the environment to detect presence or a user.

At illustrated, at least two microphones 112 in a microphone array may generate multi-channel audio data. The signal-processing component 314 may perform high-pass filtering on the multi-channel audio data at 802 to remove audio data in unwanted frequencies, baseband carrier shift at 804 to modulate the audio signal back to baseband frequency from carrier frequency, perform low-pass filtering on the multi-channel audio data at 806 to remove audio data in unwanted frequencies, and perform down sampling on the multi-channel audio data streams at 808 to produce an approximation or representation of the audio signals generated by the microphone(s) 112, but at a lower frequency rate. The signal-processing component 314 may, at 810, then perform windowing, fast Fourier transforms, and logarithmic transforms on the audio data at 810 to generate magnitude feature data 334 and phase feature data 336.

The feature-extraction component 330 may identify the first order statistics of the magnitude and frequency components in the magnitude feature data 334 and phase feature data 336, and generate multi-channel features at 814. For example, the feature-extraction component 330 may select magnitude feature data 334 from one of the multi-channel audio streams, and also determine phase feature data 318 that represents differences in phase components between phase components for two audio streams from two microphones.

At 816, the feature-extraction component 330 may perform feature stacking using the magnitude feature data 334 and phase feature data 336 to generate binned audio feature data over time. For example, the magnitude feature data 334 may comprise a 1-dimensional vector, and the phase differences between phase components be also be a 1-dimensional array representing audio data streams over a period of time that represent the ultrasonic signal reflected off objects in the environment.

At 818, the time-sequence classification component 332 may perform machine-learning model classification. For instance, the time-sequence classification component 332 may input the magnitude feature data 334 and phase feature data 336 received from the feature stacking at 818 in the ML model(s) 338. The ML model(s) 338 may output binary answers (e.g., "1" or "0," "yes" or "no<," etc.) and/or probability scores that indicate one or more of (i) motion of a person, (ii) a direction of the motion of the person, or (iii) a number of people in the room. At 820, the time-sequence classification component 332 may perform decision smooth to ensure that the ML model(s) 338 did not output a false positive. For example, the time-sequence classification component 332 may perform similar techniques using the ML model(s) 338 for a subsequent period of time that at least partly overlaps with the period of time for which audio data was just analyzed. If the audio data representing the ultrasonic signal for the partly overlapping period of time also indicates the same answer regarding movement, direction of movement, and/or number of people, the time-sequence classification component 332 may determine that there was not a false positive (and determine there was a false positive if not).

The time-sequence classification component 332 may then output at least one of a type of movement at 822 (e.g., no movement, minor movement, major movement, etc.), a movement direction 824 relative to the presence-detection device 104, and/or a number of people 826 in the environment. In some examples, the time-sequence classification component 332 may determine that the objects moving are people based at least in part on a line-of-sight of the presence-detection device 104 (or the loudspeaker(s) 110 and/or microphone(s) 112).

In some examples, the context component 342 may provide inputs in the context engine 828 in order to drive the signal-generation component 310 to perform signal generation at 830. For example, the context component 342 may provide input into signal generation 820 indicating an optimized signal frequency, how to mix the audio data representing the ultrasonic signal with other audio data that is provided to the loudspeaker(s) 110 to be converted into sound, an indication of a type of ultrasonic signal to emit (e.g., continuous, periodic, etc.) and/or other data.

Figure 9:
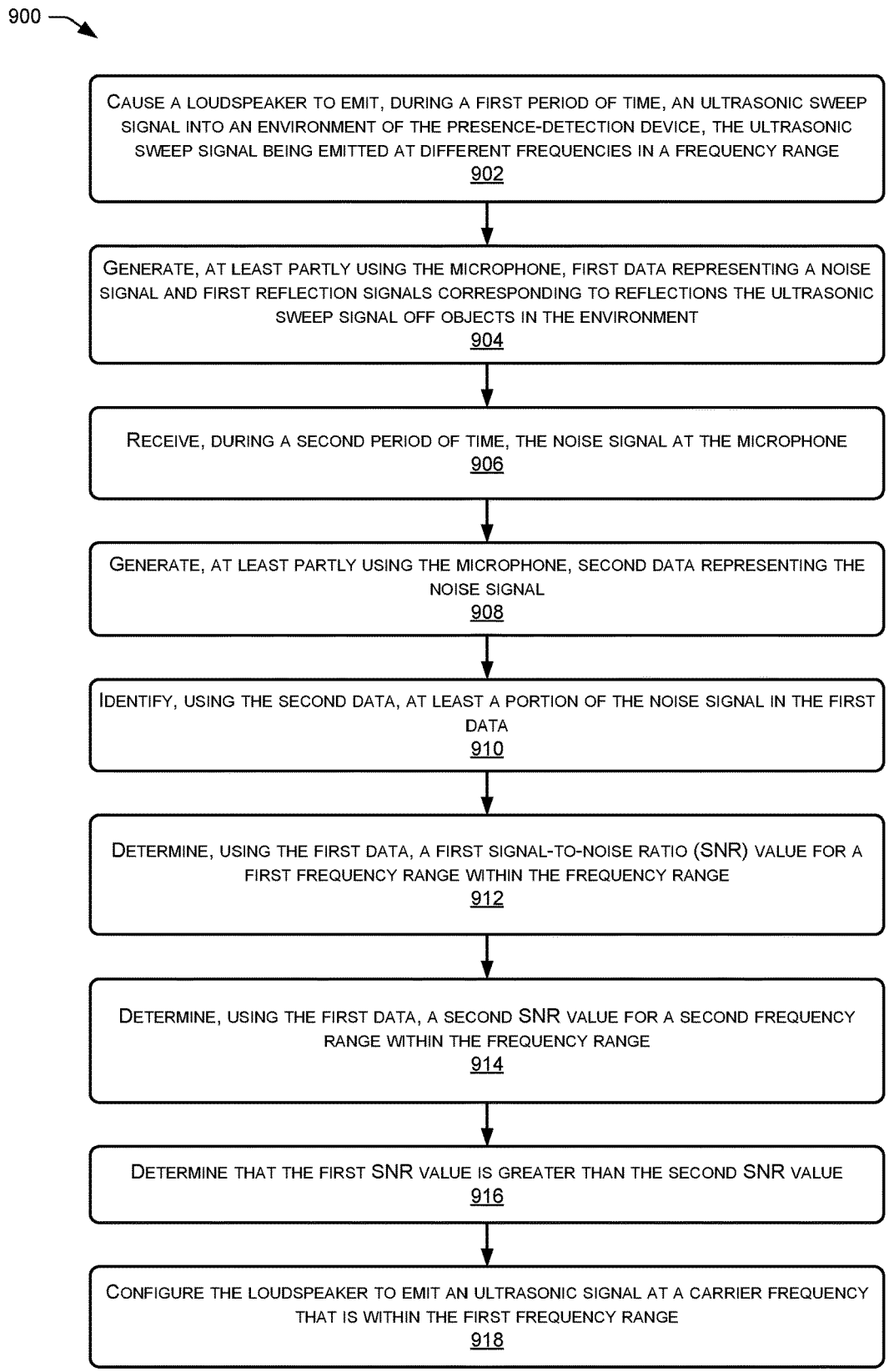
FIG. 9 illustrates a flow diagram of an example process for calibrating a presence-detection device by using an ultrasonic sweep signal to generate audio data, attenuating a portion of the audio data that represents a noise signal, and determining an optimal carrier frequency at which to emit ultrasonic signals for presence detection.

FIGS. 9 and 10 illustrate flow diagrams of example processes/methods 900 and 1000. These processes (as well as each process or method described herein,) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 9 illustrates a flow diagram of an example process 900 for calibrating a presence-detection device 104 by using an ultrasonic sweep signal 114 to generate audio data 320, attenuating a portion of the audio data 320 that represents a noise signal, and determining an optimal carrier frequency at which to emit ultrasonic signals for presence detection.

At 902, the presence-detection device 104 may cause a loudspeaker 110 to emit, during a first period of time, an ultrasonic sweep signal 114 into an environment 102 of the presence-detection device 106 where the ultrasonic sweep signal 114 being emitted at different frequencies in a frequency range. In some instances, the ultrasonic sweep signal 114 may be a linear sweep signal 206, and/or a pulsed-sweep signal 214.

At 904, the presence-detection device 104 may generate, at least partly using a microphone 112, first data 320 representing a noise signal in the environment 102 and first reflection signals 122 corresponding to reflections the ultrasonic sweep signal 114 off objects in the environment 102.

At 906, the presence-detection device 104 may receive, for a second period of time, the noise signal at the microphone 112. For instance, the presence-detection device 104 may stop the loudspeaker 110 from emitting sound, and allow the microphone 112 to receive background signals 210.

At 908, the presence-detection device 104 may generate, at least partly using the microphone 112, second data 320 representing the noise signal. At 910, the presence-detection device 104 may identify, using the second data, a portion of the noise signal in the first data. For instance, the second data 320 representing the background signals 210 may be used to identify a representation of the background signals 210 from the first audio data 320 that represents the foreground signals 208 (e.g., reflections of the ultrasonic sweep signal 114 and the background noise).

At 912, the presence-detection device 104 may determine, using the first data 320 and based at least in part on the identifying, a first signal-to-noise ratio (SNR) value for a first frequency range within the frequency range of the ultrasonic sweep signal. For instance, the presence-detection device 104 may identify the portion representing the noise signal, and use another portion representing the sweep signal to determine the SNR values. At 914, the presence-detection device 104 may determine, using the first data 320 and based at least in part on the identifying, a second SNR value for a second frequency range within the total frequency range of the ultrasonic sweep signal 114.

At 916, the presence-detection device 104 may determine that the first SNR value is greater than the second SNR value, and at 918, the presence-detection device 104 may configure the loudspeaker 110 to emit an ultrasonic signal at a carrier frequency that is within the first frequency range. For instance, if the frequency range of 31 kHz to 33 kHz has the highest SNR value, or at least one of the highest SNR values, the presence-detection device 104 may select a frequency within that range (e.g., 31.5 kHz, 32 kHz, 32.5 kHz, etc.) as a carrier frequency for ultrasonic signals that are emitted in the environment 102 for movement detection.

FIG. 10 illustrates a flow diagram of an example process 1000 for calibrating a presence-detection device 104 by using an ultrasonic sweep signal 114 to generate audio data, calculating SNR values for frequency ranges in the sweep signal, and determining an optimal carrier frequency at which to emit ultrasonic signals for presence detection.

At 1002, a computing device (e.g., presence-detection device 104) may cause a loudspeaker 110 to emit, over a period of time, an ultrasonic sweep signal 114 into an environment 102 of the computing device where the ultrasonic sweep signal being emitted at different frequencies over a frequency range. In some instances, the ultrasonic sweep signal 114 may be a linear sweep signal 206, and/or a pulsed-sweep signal 214.

At 1004, the computing device may generate, at least partly using the microphone, data representing reflected signals, corresponding to the ultrasonic sweep signal, for the period of time. For instance, the presence-detection device 104 may generate, at least partly using a microphone 112, audio data 320 representing reflection signals 122 corresponding to reflections the ultrasonic sweep signal 114 off objects in the environment 102.

At 1006, the computing device may determine, using the data, a first signal-to-noise ratio (SNR) value for a first frequency range within the frequency range of the ultrasonic sweep signal, and at 1008, the computing device may determine, using the data, a second SNR value for a second frequency range within the frequency range of the ultrasonic sweep signal.

At 1010, the computing device may determine that the first SNR value is greater than the second SNR value. For instance, if the frequency range of 31 kHz to 33 kHz has the highest SNR value, or at least one of the highest SNR values, the presence-detection device 104 may select a frequency within that range (e.g., 31.5 kHz, 32 kHz, 32.5 kHz, etc.) as a carrier frequency for ultrasonic signals that are emitted in the environment 102 for movement detection. At 1012, the computing device may configure the loudspeaker to emit an ultrasonic signal at a carrier frequency that is within the first frequency range. For instance, the presence-detection device 104 may configure the loudspeaker 110 to emit an ultrasonic signal at a carrier frequency within the first frequency range for presence-detection techniques.

As used herein, a processor, such as processor(s) 302 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 302 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 302 may possess its own local memory, which also may store program components, program data, and/or one or more operating systems.

As described herein, computer-readable media and/or memory 304 may include volatile and nonvolatile memory, removable and non-removable media implemented in any method or technology for storage of information, such as computer-readable instructions, data structures, program component, or other data. Such computer-readable media and/or memory 304 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 302 to execute instructions stored on the computer-readable media and/or memory 304. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 304, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 348 may enable communications between the presence-detection device 104 and other networked devices. Such network interface(s) 348 can include one or more network interface controllers (NICs) or other types of transceiver devices to send and receive communications over a network.

For instance, the network interface(s) 348 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 348 may include a wide area network (WAN) component to enable communication over a wide area network. The networks that the presence-detection device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A presence-detection device comprising:
    a loudspeaker;
    a microphone;
    one or more processors; and
    one or more computer-readable media storing computer-executable instructions that, when executed by the one or more processors, cause the one or more processors to perform operations comprising:
        causing the loudspeaker to emit, during a first period of time, an ultrasonic sweep signal into an environment of the presence-detection device, the ultrasonic sweep signal being emitted at different frequencies in a frequency range;
        generating, at least partly using the microphone, first data representing a noise signal in the environment and first reflection signals corresponding to reflections the ultrasonic sweep signal off objects in the environment;
        receiving, during a second period of time, the noise signal at the microphone;
        generating, at least partly using the microphone, second data representing the noise signal;

identifying, using the second data, at least a portion of the noise signal in the first data;

determining, using the first data and based at least in part on the identifying, a first signal-to-noise ratio (SNR) value for a first frequency range within the frequency range;

determining, using the first data and based at least in part on the identifying, a second SNR value for a second frequency range within the frequency range;

determining that the first SNR value is greater than the second SNR value; and configuring the loudspeaker to emit an ultrasonic signal at a carrier frequency that is within the first frequency range.

2. The presence-detection device of claim 1, the operations further comprising causing the loudspeaker to output an audible command to at least one of:

instruct a user to move through the environment;

instruct to move the presence-detection device from a first location in the environment to a second location in the environment; or change an orientation of the presence-detection device.

3. The presence-detection device of claim 1, wherein the ultrasonic sweep signal is emitted by the loudspeaker at a first power level, the operations further comprising:

determining a second power level of a portion of the first reflection signals in the first frequency range;

determining that the second power level is greater than or equal to a threshold power level associated with detecting movement in the environment; and configuring the loudspeaker to emit the ultrasonic signal at a third power level that is less than the first power level.

4. A computing device comprising:

a loudspeaker;

a microphone;

one or more processors; and one or more computer-readable media storing computer-executable instructions that, when executed by the one or more processors, cause the one or more processors to perform operations comprising:

causing the loudspeaker to emit, over a period of time, an ultrasonic sweep signal into an environment of the computing device, the ultrasonic sweep signal being emitted at different frequencies over a frequency range;

generating, at least partly using the microphone, data representing reflected signals, corresponding to the ultrasonic sweep signal, for the period of time;

determining, using the data, a first signal-to-noise ratio (SNR) value for a first frequency range within the frequency range;

determining, using the data, a second SNR value for a second frequency range within the frequency range of the;

determining that the first SNR value is greater than the second SNR value; and configuring the loudspeaker to emit an ultrasonic signal at a carrier frequency that is within the first frequency range.

5. The computing device of claim 4, wherein the data is first data, the first data represents a noise signal in the environment, and the period of time is a first period of time, the operations further comprising:

receiving the noise signal at the microphone during a second period of time that is different from the first period of time;

generating, at least partly using the microphone, second data representing the noise signal;

identifying, using the second data, a portion of the noise signal in the first data; and wherein the first SNR value and the second SNR value are determined based at least in part on the identifying.

6. The computing device of claim 4, wherein the microphone is a first microphone and the data is first data, further comprising a second microphone, and the operations further comprising:

generating, at least partly using the second microphone, second data representing the reflected signals;

determining, using the second data, a third SNR value for the first frequency range;

determining, using the second data, a fourth SNR value for the second frequency range; and determining that the third SNR value is greater than the fourth SNR value, wherein configuring the loudspeaker to emit the ultrasonic signal at the carrier frequency is based at least in part on the third SNR value being greater than the fourth SNR value.

7. The computing device of claim 4, wherein the data is first data, the ultrasonic sweep signal is a first ultrasonic sweep signal, and the period of time is a first period of time, the operations further comprising:

causing the loudspeaker to emit, during a second period of time, a second ultrasonic sweep signal into the environment;

generating second data representing reflections of the second ultrasonic sweep signal;

determining first energy data that includes a first energy value associated with the first frequency range in the first data and a second energy value associated with the first frequency range in the second data; and determining second energy data that includes a third energy value associated with the second frequency range in the first data and a fourth energy value associated with the second frequency range in the second data;

wherein the first SNR value is determined using the first energy data and the second SNR value is determined using the second energy data.

8. The computing device of claim 4, the operations further comprising causing the loudspeaker to output an audible command to at least one of:

instruct a user to move through the environment;

instruct to move the computing device from a first location in the environment to a second location in the environment; or change an orientation of the computing device.

9. The computing device of claim 4, wherein the ultrasonic sweep signal is emitted by the loudspeaker at a first power level, the operations further comprising:

determining a second power level of the reflected signals in the first frequency range;

determining that the second power level is greater than or equal to a threshold power level associated with detecting movement in the environment; and configuring the loudspeaker to emit the ultrasonic signal at a third power level that is lower than the first power level.

10. The computing device of claim 4, the operations further comprising:

determining a gain value associated with the carrier frequency; and configuring the loudspeaker to emit the ultrasonic signal according to the gain value.

11. The computing device of claim 4, wherein the data is first data, the operations further comprising:
causing the loudspeaker to output an audible command instructing a user to move through the environment;
causing the loudspeaker to emit the ultrasonic signal at the carrier frequency and at a first power level;
generating second data representing a reflected signal corresponding to the ultrasonic signal;
determining that the second data does not represent movement of the user; and
configuring the loudspeaker to emit a subsequent ultrasonic signal at a second power level that is greater than the first power level.

12. The computing device of claim 4, wherein the data is first data, the operations further comprising:
causing the loudspeaker to output an audible command that instructs a user to move within the environment;
causing the loudspeaker to emit the ultrasonic signal at the carrier frequency and at a first power level;
generating second data representing a reflection signal corresponding to the ultrasonic signal;
detecting, using the second data, movement of the user in the environment; and
configuring the loudspeaker to emit a subsequent ultrasonic signal at a second power level that is less than the first power level.

13. A method comprising:
emitting, by a loudspeaker of a computing device and during a first period of time, an ultrasonic sweep signal into an environment, the ultrasonic sweep signal being emitted at different frequencies over a frequency range;
generating, at least partly using microphone of the computing device, first data representing reflected signals, corresponding to the ultrasonic sweep signal, and a noise signal during the first period of time;
generating, at least partly using the microphone, second data representing the noise signal during a second period of time;
identifying a portion of the noise signal in the first data using the second data;
determining, using the first data and based at least in part on the identifying, a first signal-to-noise ratio (SNR) value for a first frequency range within the frequency range;
determining, using the first data, a second SNR value for a second frequency range within the frequency range;
determining that the first SNR value is greater than the second SNR value; and
configuring the loudspeaker to emit an ultrasonic signal at a carrier frequency that is within the first frequency range.

14. The method of claim 13, wherein the microphone is a first microphone and the data is first data, further comprising:
generating, at least partly using a second microphone, second data representing the reflected signals during the period of time;
determining, using the second data, a third SNR value for the first frequency range determining, using the second data, a fourth SNR value for the second frequency range; and
determining that the third SNR value is greater than the fourth SNR value,
wherein configuring the loudspeaker to emit the ultrasonic signal at the carrier frequency is based at least in part on the third SNR value being greater than the fourth SNR value.

15. The method of claim 13, wherein the ultrasonic sweep signal is a first ultrasonic sweep signal, further comprising:
causing the loudspeaker to emit, during a third period of time, a second ultrasonic sweep signal into the environment;
generating third data representing reflections of the second ultrasonic sweep signal;
determining first energy data that includes a first energy value associated with the first frequency range in the first data and a second energy value associated with the first frequency range in the third data; and
determining second energy data that includes a third energy value associated with the second frequency range in the first data and a fourth energy value associated with the second frequency range in the third data;
wherein the first SNR value is determined using the first energy data and the second SNR value is determined using the second energy data.

16. The method of claim 13, further comprising causing the loudspeaker to output an audible command to at least one of:
instruct a user to move through the environment;
instruct to move the computing device from a first location in the environment to a second location in the environment; or
change an orientation of the computing device.

17. The method of claim 13, wherein the ultrasonic sweep signal is emitted by the loudspeaker at a first power level, further comprising:
determining a second power level of a portion of the first reflection signals in the first frequency range;
determining that the second power level is less than a threshold power level associated with detecting movement in the environment; and
configuring the loudspeaker to emit the ultrasonic signal at a third power level that is greater than the first power level.

18. The method of claim 13, further comprising:
determining a gain value associated with the carrier frequency; and
configuring the loudspeaker to emit the ultrasonic signal according to the gain value.

19. The method of claim 13, further comprising:
determining a difference between a first power level at which the ultrasonic sweep signal was emitted and a second power level at which the reflected signals were received;
determining a distance between a wall of the environment and the computing device based at least in part on the difference; and
configuring the loudspeaker to emit the ultrasonic signal at a third power level based at least in part on the distance.

20. The method of claim 13, further comprising:
causing the loudspeaker to output an audible command for a user to move through the environment;
causing the loudspeaker to emit the ultrasonic signal at the carrier frequency and at a first power level;
generating third data representing the ultrasonic signal;
determining that movement of the user is unable to be detected using the third data; and configuring the loudspeaker to emit a subsequent ultrasonic signal at a second power level that is greater than the first power level.

\* \* \* \* \*